United States Patent
Chen et al.

(10) Patent No.: US 9,264,717 B2
(45) Date of Patent: Feb. 16, 2016

(54) RANDOM ACCESS WITH ADVANCED DECODED PICTURE BUFFER (DPB) MANAGEMENT IN VIDEO CODING

(71) Applicant: Qualcomm Incorporated, San Diego, CA (US)

(72) Inventors: Ying Chen, San Diego, CA (US); Ye-Kui Wang, San Diego, CA (US); Jianle Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 556 days.

(21) Appl. No.: 13/664,279

(22) Filed: Oct. 30, 2012

(65) Prior Publication Data

US 2013/0107953 A1 May 2, 2013

Related U.S. Application Data

(60) Provisional application No. 61/553,802, filed on Oct. 31, 2011, provisional application No. 61/595,605, filed on Feb. 6, 2012.

(51) Int. Cl.
*H04N 19/107* (2014.01)
*H04N 19/70* (2014.01)
*H04N 19/172* (2014.01)
(Continued)

(52) U.S. Cl.
CPC ........... *H04N 19/107* (2014.11); *H04N 19/132* (2014.11); *H04N 19/172* (2014.11); *H04N 19/177* (2014.11); *H04N 19/423* (2014.11); *H04N 19/44* (2014.11); *H04N 19/573* (2014.11); *H04N 19/70* (2014.11)

(58) Field of Classification Search
None
See application file for complete search history.

(56) References Cited

U.S. PATENT DOCUMENTS 7,149,247 B2 12/2006 Sullivan
7,253,831 B2 8/2007 Gu
(Continued)

FOREIGN PATENT DOCUMENTS

JP 2004274732 A 9/2004
JP 2005516496 A 6/2005
(Continued)

OTHER PUBLICATIONS

Tan, "Clean decoding refresh definition and decoding process," JCTVC-F381, Torino, Jul. 14-22, 2011.*
(Continued)

*Primary Examiner* — William C Vaughn, Jr.
*Assistant Examiner* — Michael J Hess
(74) *Attorney, Agent, or Firm* — Shumaker & Sieffert, P.A.

(57) ABSTRACT

As one example, techniques for decoding video data include receiving a bitstream that includes one or more pictures of a coded video sequence (CVS), decoding a first picture according to a decoding order, wherein the first picture is a random access point (RAP) picture that is not an instantaneous decoding refresh (IDR) picture, and decoding at least one other picture following the first picture according to the decoding order based on the decoded first picture. As another example, techniques for encoding video data include generating a bitstream that includes one or more pictures of a CVS, wherein a first picture according to the decoding order is a RAP picture that is not an IDR picture, and avoiding including at least one other picture, other than the first picture, that corresponds to a leading picture associated with the first picture, in the bitstream.

44 Claims, 6 Drawing Sheets

(51) Int. Cl.
*H04N 19/132* (2014.01)
*H04N 19/177* (2014.01)
*H04N 19/44* (2014.01)
*H04N 19/423* (2014.01)
*H04N 19/573* (2014.01)

(56) References Cited

U.S. PATENT DOCUMENTS

| | | |
|---|---|---|
| 7,430,361 B2 | 9/2008 | Roelens |
| 7,492,387 B2 | 2/2009 | Yang et al. |
| 7,495,587 B2 | 2/2009 | Bae |
| 7,782,903 B2 | 8/2010 | Yousef |
| 7,782,950 B2 | 8/2010 | Jeon et al. |
| 7,801,223 B2 | 9/2010 | Winger |
| 7,869,501 B2 | 1/2011 | Park et al. |
| 8,036,272 B2 | 10/2011 | Suzuki |
| 8,050,328 B2 | 11/2011 | Iguchi et al. |
| 8,073,059 B2 | 12/2011 | Lim et al. |
| 8,175,154 B2 | 5/2012 | Luthra |
| 8,194,741 B2 | 6/2012 | Yang et al. |
| 8,693,539 B2 | 4/2014 | Lim et al. |
| 2004/0161033 A1 | 8/2004 | Notoya et al. |
| 2004/0190606 A1 | 9/2004 | Deshpande |
| 2004/0218668 A1 | 11/2004 | Hannuksela et al. |
| 2005/0123056 A1 | 6/2005 | Wang et al. |
| 2006/0083298 A1 | 4/2006 | Wang et al. |
| 2006/0294171 A1 | 12/2006 | Bossen et al. |
| 2007/0086521 A1 | 4/2007 | Wang et al. |
| 2007/0168644 A1 | 7/2007 | Hummel et al. |
| 2007/0183499 A1 | 8/2007 | Kimata et al. |
| 2007/0206673 A1 | 9/2007 | Cipolli et al. |
| 2007/0242508 A1 | 10/2007 | Bae |
| 2007/0247549 A1 | 10/2007 | Jeong et al. |
| 2008/0117985 A1 | 5/2008 | Chen et al. |
| 2008/0137742 A1 | 6/2008 | Chen et al. |
| 2008/0165860 A1 | 7/2008 | Sahraoui et al. |
| 2008/0232467 A1 | 9/2008 | Iguchi et al. |
| 2008/0260034 A1 | 10/2008 | Wang et al. |
| 2008/0301742 A1 | 12/2008 | Hannuksela et al. |
| 2008/0317138 A1 | 12/2008 | Jia |
| 2009/0003445 A1 | 1/2009 | Ying et al. |
| 2009/0003447 A1 | 1/2009 | Christoffersen et al. |
| 2009/0080533 A1 | 3/2009 | Folta et al. |
| 2009/0150620 A1 | 6/2009 | Paver et al. |
| 2009/0168805 A1 | 7/2009 | Sullivan et al. |
| 2009/0168886 A1 | 7/2009 | Ikeda et al. |
| 2009/0220010 A1 | 9/2009 | Park et al. |
| 2009/0238261 A1 | 9/2009 | Bhavani et al. |
| 2009/0262804 A1 | 10/2009 | Pandit et al. |
| 2009/0285096 A1 | 11/2009 | Yousef |
| 2009/0296811 A1 | 12/2009 | Jeon et al. |
| 2009/0297051 A1 | 12/2009 | Nonaka et al. |
| 2009/0304068 A1 | 12/2009 | Pandit et al. |
| 2010/0020870 A1 | 1/2010 | Jeon et al. |
| 2010/0046619 A1 | 2/2010 | Koo et al. |
| 2010/0118933 A1 | 5/2010 | Pandit et al. |
| 2010/0135385 A1 | 6/2010 | Park et al. |
| 2010/0158120 A1 | 6/2010 | Fang et al. |
| 2010/0189173 A1 | 7/2010 | Chen et al. |
| 2010/0189182 A1 | 7/2010 | Hannuksela |
| 2010/0238822 A1 | 9/2010 | Koyabu et al. |
| 2010/0246662 A1* | 9/2010 | Koto .............. H04N 19/00193 375/240.1 |
| 2010/0262711 A1 | 10/2010 | Bouazizi |
| 2010/0266042 A1 | 10/2010 | Koo et al. |
| 2011/0013889 A1 | 1/2011 | Wu et al. |
| 2011/0032999 A1 | 2/2011 | Chen et al. |
| 2011/0080949 A1 | 4/2011 | Takahashi et al. |
| 2011/0090957 A1 | 4/2011 | Liao et al. |
| 2011/0142130 A1 | 6/2011 | Lin et al. |
| 2011/0200112 A1 | 8/2011 | Won et al. |
| 2011/0216836 A1* | 9/2011 | Luo .................. H04N 19/00 375/240.25 |
| 2011/0246659 A1 | 10/2011 | Bouazizi |
| 2012/0069903 A1 | 3/2012 | Lim et al. |
| 2012/0185570 A1 | 7/2012 | Bouazizi et al. |
| 2012/0230401 A1 | 9/2012 | Chen et al. |
| 2012/0230409 A1 | 9/2012 | Chen et al. |
| 2012/0230433 A1 | 9/2012 | Chen et al. |
| 2012/0320984 A1 | 12/2012 | Zhou |
| 2014/0146885 A1* | 5/2014 | Park ................ H04N 21/42623 375/240.12 |
| 2014/0241435 A1* | 8/2014 | Park ................... H04N 19/433 375/240.16 |

FOREIGN PATENT DOCUMENTS

| | | |
|---|---|---|
| JP | 2006519517 A | 8/2006 |
| JP | 2007184791 A | 7/2007 |
| JP | 2008219204 A | 9/2008 |
| JP | 2009260736 A | 11/2009 |
| JP | 2009290389 A | 12/2009 |
| JP | 2009543508 A | 12/2009 |
| JP | 2010516103 A | 5/2010 |
| JP | 2010219983 A | 9/2010 |
| KR | 1020060081970 A | 7/2006 |
| RU | 2326505 C2 | 6/2008 |
| RU | 2409006 C1 | 1/2011 |
| TW | 200829034 A | 7/2008 |
| WO | 2004088988 A1 | 10/2004 |
| WO | 2006075635 A1 | 7/2006 |
| WO | 2007114612 A1 | 10/2007 |
| WO | 2008007913 A1 | 1/2008 |
| WO | 2008047316 A1 | 4/2008 |
| WO | 2008085935 A1 | 7/2008 |
| WO | 2009130561 A1 | 10/2009 |
| WO | 2010109904 A1 | 9/2010 |
| WO | 2013002700 A1 | 1/2013 |

OTHER PUBLICATIONS

Wiegand et al., "WD1: Working Draft 1 of High-Efficiency Video Coding", JCTVC-C403, 3rd Meeting: Guangzhou, CN, Oct. 7-15, 2010, 137 pp.

Wiegand et al., "WD2: Working Draft 2 of High-Efficiency Video Coding," JCTVC-D503, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011,193 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, Switzerland, Nov. 2011, JCTVC-G1103_d2, 214 pp.

Bross et al., "High efficiency video coding (HEVC) text specification draft 6," 7th Meeting: Geneva, CH, Nov. 21-30, 2011, JCTVC-H1003, 259 pp.

Bross et al., "High efficiency video coding (HEVC) text specification draft 7," 9th Meeting: Geneva, CH, Apr. 27-May 7, 2012, JCTVC-I1003_d21, 290 pp.

Bross et al., "High efficiency video coding (HEVC) text specification draft 8," 10th Meeting: Stockholm, SE, Jul. 11-20, 2012, JCTVC-J1003_d7, 261 pp.

ITU-T H.264, Series H: Audiovisual and Multimedia Systems, Infrastructure of audiovisual services—Coding of moving video, Advanced video coding for generic audiovisual services, the International Telecommunication Union. Jun. 2011, 674 pp.

Sjoberg et al., "Absolute signaling of reference pictures," 6th Meeting: Torino, IT,Jul. 2011, Document: JCTVC-F493, 15 pp.

Wenger et al., "Adaptation Parameter Set (APS)," JCTVC-F747r3, 6th Meeting: Torino, IT, Jul. 14-22, 2011, 10 pp.

U.S. Appl. No. 13/623,768, by Ying Chen, filed Sep. 20, 2012.
U.S. Appl. No. 13/622,928, by Ye-Kui Wang, filed Sep. 19, 2012.
U.S. Appl. No. 13/622,961, by Ye-Kui Wang, filed Sep. 19, 2012.
U.S. Appl. No. 13/622,929, by Ye-Kui Wang, filed Sep. 19, 2012.
U.S. Appl. No. 13/622,944, by Ying Chen, filed Sep. 19, 2012.
U.S. Appl. No. 13/622,931, by Ying Chen, filed Sep. 19, 2012.
U.S. Appl. No. 13/622,972, by Ye-Kui Wang, filed Sep. 19, 2012.

(56) References Cited

OTHER PUBLICATIONS

ITU-T H.265, Series H: Audiovisual and Multimedia Systems, Infrastructure of audiovisual services—Coding of moving video, Advanced video coding for generic audiovisual services, The International Telecommunication Union, Oct. 2014, 540 pp.
Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.
Bross et al., "High efficiency video coding (HEVC) text specification draft 6," 8th Meeting: San Jose, CA, USA, Feb. 1-10, 2012, JCTVC-H1003, 259 pp.
Bross et al., "High efficiency video coding (HEVC) text specification draft 9," 11th Meeting: Shanghai, CN, Oct. 10-19, 2012, JCTVC-K1003_v7, 290 pp.
Flynn, et al., "JCT-VC AHG report: Reference picture buffering and list construction (AHG21)", JCT-VC Meeting; MPEG Meeting; Nov. 21, 2011-Nov. 30, 2011; Geneva; (Joint Collaborative Team on Video Coding of ISO/IEC JTC1/SC29/WG11 and ITU-T SG.16 ); URL: http://wftp3.itu.int/av-arch/jctvc-site/, No. JCTVC-G021, XP030110020, 9 pp.
Hannuksela et al., "AHG21: on reference picture list construction and reference picture marking", JCT-VC Meeting; MPEG Meeting; Nov. 21, 2011-Nov. 30, 2011; Geneva; (Joint Collaborative Team on Video Coding of ISO/IEC JTC1/SC29/WG11 and ITU-T SG.16); URL: http://wftp3.itu.int/av-arch/jctvc-site/, No. JCTVC-G643, XP030110627, 10 pp.
Hannuksela "Signaling of Clean Random Access Positions", Joint Video Team (JVT) of ISO/IEC MPEG & ITU-T VCEG (ISO/IEC JTC1/SC29/WG11 and ITU-T SG16 Q6), May 6-10, 2002, XP002264575, 6 pp.
Hannuksela "POC Issues", JVT Meeting; MPEG Meeting; Dec. 5, 2002-Dec. 13, 2002; AWAJI, Island, JP; (Joint Video Team of ISO/IEC JTC1/SC29/WG11 and ITU-T SG.16), No. JVT-F044, Dec. 13, 2002, XP030005614, 10 pp.
International Preliminary Report on Patentability—PCT/US2012/062830, The International Bureau of WIPO—Geneva, Switzerland, Mar. 27, 2014, 13 pp.
International Search Report and Written Opinion—PCT/US2012/062830—ISA/EPO—Mar. 22, 2013, 23 pp.
ITU-T H.265, Series H: Audiovisual and Multimedia Systems, Infrastructure of audiovisual services—Coding of moving video, High efficiency video coding, The International Telecommunication Union, Apr. 2013, 317 pp.
Invitation to Pay Additional Fees—PCT/US2012/062830—ISA/EPO—Feb. 6, 2013, 9 pp.
Shen et al., "Buffer Requirement Analysis and Reference Picture Marking for Temporal Scalable Video Coding", Packet Video, Nov. 1, 2007, IEEE, XP031170603, ISBN: 978-1-4244-0980-8, pp. 91-97.
Sjöberg et al., "Proposed changes to the HEVC Working Draft," Joint Collaborative Team on Video Coding, attachment to JCTVC-F493, Jul. 14-22, 2011, 28 pp.
Sjöberg et al., "AHG21: Long-term pictures and pruning of reference picture sets', JCT-VC Meeting; MPEG Meeting; Nov. 21, 2011-Nov. 30, 2011; Geneva; (Joint Collaborative Team on Video Coding of ISO/IEC JTC1/SC29/WG11 and ITU-T SG.16); URL: http://wftp3.itu.int/av-arch/jctvc-site/" No. JCTVC-G637, XP030110621, 3 pp.
Tan, et al., "Clean Decoding Refresh Definition and Decoding Process", JCT-VC Meeting; MPEG Meeting; Jul. 14, 2011-Jul. 22, 2011; Torino; (Joint Colloborative Team on Video Coding of ISO/IEC JTC1/SC29/WG11 and ITU-T SG.16); URL : Http://WFTP3.ITU.INT/AV-ARCH/JCTVC-SITE/, No. JCTVC-F381, XP030009404, 3 pp.
Wahadaniah et al., "AHG21: Construction and modification of pre-defined reference picture sets and reference picture lists", JCT-VC Meeting; MPEG Meeting; Nov. 21, 2011-Nov. 30, 2011; Geneva; (Joint Collaborative Team on Video Coding of ISO/IEC JTC1/SC29/WG11 and ITU-T SG.16); URL: http://wftp3.itu.int/av-arch/jctvc-site/, No. JCTVC-G548, XP030110532, 21 pp.
"AHG21: On DPB management", MPEG Meeting; Nov. 21, 2011-Nov. 30, 2011; Geneva; (Motion Picture Expert Group or ISO/IEC JTC1/SC29/WG11), No. m21876, XP030050439, 7 pp.
Wang, et al., "On reference picture list construction", MPEG Meeting; Jan. 20, 2011-Jan. 28, 2011; DAEGU; (Motion Picture Expert Group or ISO/IEC JTC1/SC29/WG11), No. m18831, XP030047400, 3 pp.
Webb, "HRD Conformance for Real-time H.264 Video Encoding", Image Processing, 2007. ICIP 2007. IEEE International Conference on, IEEE, PI, Sep. 1, 2007, pp. V-305-V-308, XP031158546, ISBN: 978-1-4244-1436-9, 4 pp.
Second Written Opinion from International Application No. PCT/US2012/062830, dated Jan. 9, 2014, 8 pp.
Chen Y. et al., "Conforming bitstreams starting with CRA pictures," Joint Collaborative Team on Video Coding (JCT-VC) of ITU-T SG16 WP3 and ISO/IECJTC1/SC29/WG11), 7th Meeting: Geneva, CH, Nov. 21-30, 2011, JCTVC-G319, 7 pp.
Hsu et al., "Unified Syntax of Reference Picture List Reordering," Joint Collaborative Team on Video Coding (JCT-VC) of ITU-T SG16 WP3 and ISO/IEC JTC1/SC29/WG11, 5th Meeting: Geneva, CH, Mar. 16-23, 2011 [JCTVC-E053], 4 1311.
Wang et al., "On CDR Picture," Joint Collaborative Team on Video Coding (JCT-VC) of ITU-T SG16 WP3 and ISO/IEC JTC1/SC29/WG11, 6th Meeting: Torino, IT, Jul. 14-22, 2011, JCTVC-F464, 4 pp.
Wang et al., "On reference picture marking," Joint Collaborative Team on Video Coding (JCT-VC) of ITU-T SG16 WP3 and ISO/IEC JTC1/SC29/WG11, 6th Meeting: Torino, IT, Jul. 14-22, 2011, [JCTVC-F462], 3 pp.
Wang et al., "POC Recovery in Random Access Point SEI Message," Joint Video Team (JVT) of ISO/IEC MPEG & ITU-T VCEG (ISO/IEC JTC1/SC29/WG11 and ITU-T SG16 Q.6) 6th Meeting: Awaji, Island, JP, Dec. 5-13, 2002, JCT-F050, 6 pp.
Wang et al., "AHG21: On DPB management," Joint Collaborative Team on Video Coding (JCT-VC) of ITU-T SG16 WP3 and ISO/IEC JTC1/SC29/WG11 7th Meeting: Geneva, CH, Nov. 21-30, 2011, JCTVC-G314, 8 pp.
Wiegand, "Editor's Proposed Draft Text Modifications for Joint Video Specification (ITU-T Rec. H.264 | ISO/IEC 14496-10 AVC), Geneva modifications draft 37," Joint Video Team (JVT) of ISO/IEC MPEG and ITU-T VCEG, 5th Meeting: Geneva, Switzerland, Oct. 9-17, 2002, JVT-E146d37, pp. i, 57-63.

\* cited by examiner

RANDOM ACCESS WITH ADVANCED DECODED PICTURE BUFFER (DPB) MANAGEMENT IN VIDEO CODING

This application claims the benefit of U.S. Provisional Application No. 61/553,802, filed Oct. 31, 2011, and U.S. Provisional Application No. 61/595,605, filed Feb. 6, 2012, the entire contents of each of which are incorporated herein by reference.

TECHNICAL FIELD

This disclosure relates to video coding, and, more particularly, to coding frames of video data generated by video coding processes.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding ("AVC"), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients. Entropy coding may then be applied to achieve even more compression.

SUMMARY

This disclosure describes techniques for random access in video coding. In particular, the disclosure describes several techniques for coding video sequences that include one or more frames, or "pictures," wherein a first coded picture of a particular coded video sequence (CVS) in a conforming bitstream may be a random access point (RAP) picture that is not an instantaneous decoding refresh (IDR) picture. For example, consistent with the techniques, the first coded picture may be a clean random access (CRA) picture.

As one example, the techniques of this disclosure may enable a video decoder conforming to the techniques to successfully decode a bitstream starting from such a non-IDR RAP picture in a predictable and defined, or "standard" manner. For example, the disclosed techniques may enable the conforming video decoder to manipulate various output and reference properties of so-called "leading pictures" associated with the first coded picture that are also included in the bitstream. As a result, the techniques may enable relatively improved random access of the bitstream by the video decoder, compared to other techniques. For example, the techniques may facilitate "finer," or more granular, random access of the bitstream by enabling the video decoder to decode the bitstream at relatively more starting points, or access pictures (i.e., non-IDR pictures) of the bitstream, compared to other techniques (e.g., techniques that allow random access of a bitstream only from IDR pictures). Additionally, the techniques may enable the conforming video decoder to improve visual quality of one or more other pictures also included in the bitstream, e.g., by avoiding outputting and/or using as reference pictures the leading pictures associated with the first picture.

Alternatively, as another example, the disclosed techniques may enable a video encoder conforming to the techniques to generate a bitstream that excludes leading pictures associated with a first coded picture of the bitstream that is a non-IDR RAP picture. As a result, a video decoder also conforming to the disclosed techniques may successfully decode the bitstream in a predictable and defined manner.

Accordingly, using the techniques of this disclosure may improve interoperability of video encoding and decoding systems and devices, and user experience, generally, for bitstream random access that may occur frequently in various video applications.

In one example of the disclosure, a method of decoding video data includes receiving a bitstream comprising one or more pictures of a CVS, decoding a first picture of the one or more pictures according to a decoding order associated with the CVS, wherein the first picture is a RAP picture that is not an IDR picture, and decoding at least one of the one or more pictures, other than the first picture, following the first picture according to the decoding order, based on the decoded first picture.

In another example of the disclosure, a method of encoding video data includes generating a bitstream comprising one or more pictures of a CVS, wherein a first picture of the one or more pictures according to a decoding order associated with the CVS is a RAP picture that is not an IDR picture, wherein generating the bitstream comprises avoiding including at least one of the one or more pictures, other than the first picture, that corresponds to a leading picture associated with the first picture, in the bitstream, wherein the leading picture comprises a picture that follows the first picture according to the decoding order and precedes the first picture according to a display order associated with the CVS, and wherein the first picture is decodable, and wherein at least one of the one or more pictures, other than the first picture, following the first picture according to the decoding order, is decodable based on the first picture.

In another example of the disclosure, an apparatus configured to decode video data includes a video decoder configured to receive a bitstream comprising one or more pictures of a CVS, decode a first picture of the one or more pictures according to a decoding order associated with the CVS, wherein the first picture is a RAP picture that is not an IDR picture, and decode at least one of the one or more pictures, other than the first picture, following the first picture according to the decoding order, based on the decoded first picture.

In another example of the disclosure, an apparatus configured to encode video data includes a video encoder configured to generate a bitstream comprising one or more pictures of a CVS, wherein a first picture of the one or more pictures according to a decoding order associated with the CVS is a RAP picture that is not an IDR picture, wherein to generate the bitstream, the video encoder is configured to avoid including at least one of the one or more pictures, other than the first picture, that corresponds to a leading picture associated with the first picture, in the bitstream, wherein the leading picture comprises a picture that follows the first picture according to the decoding order and precedes the first picture according to a display order associated with the CVS, and wherein the first picture is decodable, and wherein at least one of the one or more pictures, other than the first picture, following the first picture according to the decoding order, is decodable based on the first picture.

In another example of the disclosure, a device for decoding video data includes means for receiving a bitstream comprising one or more pictures of a CVS, means for decoding a first picture of the one or more pictures according to a decoding order associated with the CVS, wherein the first picture is a RAP picture that is not an IDR picture, and means for decoding at least one of the one or more pictures, other than the first picture, following the first picture according to the decoding order, based on the decoded first picture.

In another example of the disclosure, a device for encoding video data includes means for generating a bitstream comprising one or more pictures of a CVS, wherein a first picture of the one or more pictures according to a decoding order associated with the CVS is a RAP picture that is not an IDR picture, wherein the means for generating the bitstream comprises means for avoiding including at least one of the one or more pictures, other than the first picture, that corresponds to a leading picture associated with the first picture, in the bitstream, wherein the leading picture comprises a picture that follows the first picture according to the decoding order and precedes the first picture according to a display order associated with the CVS, and wherein the first picture is decodable, and wherein at least one of the one or more pictures, other than the first picture, following the first picture according to the decoding order, is decodable based on the first picture.

The techniques described in this disclosure may be implemented in hardware, software, firmware, or combinations thereof. If implemented in hardware, an apparatus may be realized as an integrated circuit, a processor, discrete logic, or any combination thereof. If implemented in software, the software may be executed in one or more processors, such as a microprocessor, application specific integrated circuit (ASIC), field programmable gate array (FPGA), or digital signal processor (DSP). The software that executes the techniques may be initially stored in a tangible computer-readable medium and loaded and executed in the processor.

Accordingly, in another example, this disclosure contemplates a computer-readable storage medium storing instructions that, when executed, cause one or more processors to receive a bitstream comprising one or more pictures of a CVS, decode a first picture of the one or more pictures according to a decoding order associated with the CVS, wherein the first picture is a RAP picture that is not an IDR picture, and decode at least one of the one or more pictures, other than the first picture, following the first picture according to the decoding order, based on the decoded first picture.

In another example, this disclosure contemplates a computer-readable storage medium storing instructions that, when executed, cause one or more processors to generate a bitstream comprising one or more pictures of a CVS, wherein a first picture of the one or more pictures according to a decoding order associated with the CVS is a RAP picture that is not an IDR picture, wherein the instructions that cause the one or more processors to generate the bitstream comprise instructions that cause the one or more processors to avoid including at least one of the one or more pictures, other than the first picture, that corresponds to a leading picture associated with the first picture, in the bitstream, wherein the leading picture comprises a picture that follows the first picture according to the decoding order and precedes the first picture according to a display order associated with the CVS, and wherein the first picture is decodable, and wherein at least one of the one or more pictures, other than the first picture, following the first picture according to the decoding order, is decodable based on the first picture.

The details of one or more examples are set forth in the accompanying drawings and the description below. Other features, objects, and advantages will be apparent from the description and drawings, and from the claims.

DETAILED DESCRIPTION

Figure 1:
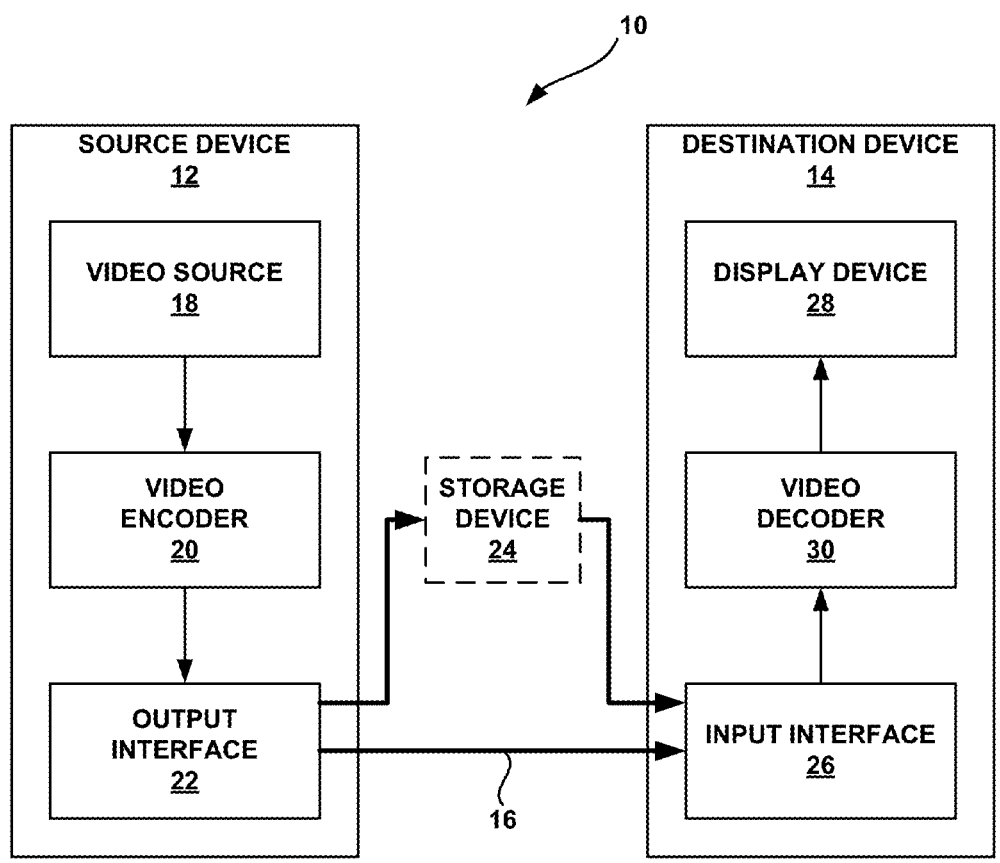
FIG. 1 is a block diagram that illustrates an example of a video encoding and decoding system that may perform techniques for random access with advanced decoder picture buffer (DPB) management, consistent with the techniques of this disclosure.

This disclosure describes techniques for random access in video coding. In particular, the disclosure describes several techniques for coding video sequences that include one or more frames, or "pictures," wherein a first coded picture of a particular coded video sequence (CVS) in a conforming bitstream may be a random access point (RAP) picture that is not an instantaneous decoding refresh (IDR) picture. For example, consistent with the techniques, the first coded picture may be a clean random access (CRA) picture.

As one example, the techniques of this disclosure may enable a video decoder conforming to the techniques to successfully decode a bitstream starting from such a non-IDR RAP picture in a predictable and defined, or "standard" manner. For example, the disclosed techniques may enable the conforming video decoder to manipulate various output and reference properties of so-called "leading pictures" associated with the first coded picture that are also included in the bitstream. As a result, the techniques may enable relatively improved random access of the bitstream by the video decoder, compared to other techniques. For example, the techniques may facilitate "finer," or more granular, random access of the bitstream by enabling the video decoder to decode the bitstream at relatively more starting points, or access pictures (i.e., non-IDR pictures) of the bitstream, compared to other techniques (e.g., techniques that allow random access of a bitstream only from IDR pictures). Additionally, the techniques may enable the conforming video decoder to improve visual quality of one or more other pictures also included in the bitstream, e.g., by avoiding outputting and/or using as reference pictures the leading pictures associated with the first picture.

Alternatively, as another example, the disclosed techniques may enable a video encoder conforming to the techniques to generate a bitstream that excludes leading pictures associated with a first coded picture of the bitstream that is a non-IDR RAP picture. As a result, a video decoder also conforming to the disclosed techniques may successfully decode the bitstream in a predictable and defined manner.

Accordingly, using the techniques of this disclosure may improve interoperability of video encoding and decoding systems and devices, and user experience, generally, for bitstream random access that may occur frequently in various video applications.

Specifically, the techniques described herein may include at least one or more of the following novel aspects, compared to other techniques: (1) detecting an occurrence of random access from a non-IDR RAP picture (e.g., a CRA picture); 2) identifying and decoding one or more pictures that follow the non-IDR RAP picture in a decoding order, but precede the non-IDR RAP picture in an output order (i.e., one or more "leading pictures" of the non-IDR RAP picture); and (3) specifying that each of the one or more leading pictures of the non-IDR RAP picture is not output even in the event a corresponding signaled syntax element output_flag is equal to true, or "1" (i.e., the output_flag indicates that the respective picture is to be output), and that the respective picture is not used as a reference picture for any other pictures that follow the non-IDR RAP picture in the decoding order and the output order.

In this manner, a bitstream that includes one or more pictures of video data and begins with a non-IDR RAP picture may be decoded in a predictable and defined manner by a video decoder conforming to the techniques of this disclosure. Alternatively, a video encoder conforming to the disclosed techniques may generate a bitstream that includes one or more pictures of video data and begins with a non-IDR RAP picture, such that the bitstream may be decoded in a predictable and defined manner by a video decoder also conforming to the techniques. As a result, there may be a relative improvement in user experience when performing random access of a bitstream that includes one or more pictures of video data, when using the techniques of this disclosure. In particular, there may be a relative improvement in the granularity of the random access, as well as in visual quality of one or more pictures of the bitstream, and/or of a CVS that includes the one or more pictures as a whole, when using the disclosed techniques.

FIG. 1 is a block diagram that illustrates an example of a video encoding and decoding system that may perform techniques for random access with advanced decoder picture buffer (DPB) management, consistent with the techniques of this disclosure. As shown in FIG. 1, system 10 includes a source device 12 that generates encoded video data to be decoded at a later time by a destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming devices, or the like. In some cases, source device 12 and destination device 14 may be equipped for wireless communication.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Alternatively, encoded data may be output from output interface 22 to a storage device 24. Similarly, encoded data may be accessed from storage device 24 by input interface 26. Storage device 24 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 24 may correspond to a file server or another intermediate storage device that may hold the encoded video generated by source device 12. Destination device 14 may access stored video data from storage device 24 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 24 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 24 for later access by destination device 14 or other devices, for decoding and/or playback.

Destination device 14 includes an input interface 26, a video decoder 30, and a display device 28. In some cases, input interface 26 may include a receiver and/or a modem. Input interface 26 of destination device 14 receives the encoded video data over link 16 or from storage device 24. The encoded video data communicated over link 16, or provided on storage device 24, may include a variety of syntax elements generated by video encoder 20 for use by a video decoder, such as video decoder 30, in decoding the video data. Such syntax elements may be included with the encoded video data transmitted on a communication medium, stored on a storage medium, or stored on a file server.

Display device 28 may be integrated with, or be external to, destination device 14. In some examples, destination device 14 may include an integrated display device and also be configured to interface with an external display device. In other examples, destination device 14 may be a display device. In general, display device 28 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to a video compression standard, such as the High Efficiency Video Coding (HEVC) standard presently under development by the Joint Collaborative Team on Video Coding (JCT-VC) of ITU-T Video Coding Experts Group (VCEG) and ISO/IEC Motion Picture Experts Group (MPEG), and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, AVC, or extensions of such standards. The techniques of this disclosure, however, are not limited to any particular coding standard. Other examples of video compression standards include MPEG-2 and ITU-T H.263. A recent draft of the HEVC standard, referred to as "HEVC Working Draft 8" or "WD8," is described in document JCTVC-J1003_d7, Bross et al., "High efficiency video coding (HEVC) text specification draft 8," Joint Collaborative Team on Video Coding (JCT-VC) of ITU-T SG16 WP3 and ISO/IEC JTC1/SC29/WG11, 10th Meeting: Stockholm, SE, 11-20 Jul. 2012, which, as of Oct. 17, 2012, is downloadable from http://phenix.int-evey.fr/jct/doc_end_user/documents/10_Stockholm/wg11/JCTVC-J1003-v8.zip.

Another draft of the HEVC standard, referred to in this disclosure as "HEVC Working Draft 4" or "WD4," is described in document JCTVC-F803, Bross et al., "WD4: Working Draft 4 of High-Efficiency Video Coding," Joint Collaborative Team on Video Coding (JCT-VC) of ITU-T SG16 WP3 and ISO/IEC JTC1/SC29/WG11, 6th Meeting: Torino, IT, 14-22 Jul. 2011, which, as of October 117, 2012, is downloadable from http://phenix.int-evey.fr/jct/doc_en-d_user/documents/6_Torino/wg11/JCTVC-F803-v8.zip.

Still another draft of the HEVC standard, referred to in this disclosure as "HEVC Working Draft 5" or "WD5," is described in document JCTVC-G1103, Bross et al., "WD5: Working Draft 5 of High-Efficiency Video Coding," Joint Collaborative Team on Video Coding (JCT-VC) of ITU-T SG16 WP3 and ISO/IEC JTC1/SC29/WG11, 7th Meeting: Geneva, CH, 21-30 Nov. 2011, which, as of Oct. 17, 2012, is downloadable from http://phenix.int-evry.fr/jct/doc_en-d_user/documents/7_Geneva/wg11/JCTVC-G1103-v12.zip.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder ("CODEC") in a respective device.

The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-five intra-prediction encoding modes.

In general, the working model of the HM describes that a video frame or picture may be divided into a sequence of treeblocks or largest coding units (LCU) that include both luma and chroma samples. A treeblock has a similar purpose as a macroblock of the H.264 standard. A slice includes a number of consecutive treeblocks in coding order. A video frame or picture may be partitioned into one or more slices. Each treeblock may be split into coding units (CUs) according to a quadtree. For example, a treeblock, as a root node of the quadtree, may be split into four child nodes, and each child node may in turn be a parent node and be split into another four child nodes. A final, unsplit child node, as a leaf node of the quadtree, comprises a coding node, i.e., a coded video block. Syntax data associated with a coded bitstream may define a maximum number of times a treeblock may be split, and may also define a minimum size of the coding nodes.

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as TUs. Pixel difference values associated with the TUs may be transformed to produce transform coefficients, which may be quantized.

In general, a PU includes data related to the prediction process. For example, when the PU is intra-mode encoded, the PU may include data describing an intra-prediction mode for the PU. As another example, when the PU is inter-mode encoded, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

In general, a TU is used for the transform and quantization processes. A given CU having one or more PUs may also include one or more TUs. Following prediction, video encoder 20 may calculate residual values corresponding to the PU. The residual values comprise pixel difference values that may be transformed into transform coefficients, quantized, and scanned using the TUs to produce serialized transform coefficients for entropy coding. This disclosure typically uses the term "video block," or simply "block," to refer to a coding node of a CU. In some specific cases, this disclosure may also use the term "video block" to refer to a treeblock, i.e., LCU, or a CU, which includes a coding node and PUs and TUs.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

In some examples, video encoder 20 may utilize a predefined scanning, or "scan" order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context adaptive variable length coding (CAVLC), context adaptive binary arithmetic coding (CABAC), syntax-based context-adaptive binary arithmetic coding (SBAC), Probability Interval Partitioning Entropy (PIPE) coding, or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether or not neighboring values of the symbol are zero-valued. To perform CAVLC, video encoder 20 may select a variable length code for a symbol to be transmitted. Codewords in VLC may be constructed such that relatively shorter codes correspond to more probable symbols, while relatively longer codes correspond to less probable symbols. In this manner, the use of VLC may achieve a bit savings over, for example, using equal-length codewords for each symbol to be transmitted. The probability determination may be based on a context assigned to the symbol.

In some examples, the techniques of this disclosure are directed to random access in video coding. In particular, this disclosure describes several techniques for coding video sequences that include one or more frames, or pictures, wherein a first coded picture of a particular CVS in a conforming bitstream may be a RAP picture that is not an IDR picture. For example, consistent with the disclosed techniques, the first coded picture may be a CRA picture.

In other words, a bitstream that includes one or more pictures of a CVS, wherein a first coded picture of the bitstream is a non-IDR RAP picture, may be considered a "conforming" bitstream according to the techniques of this disclosure. Stated another way, a video decoder that conforms to the disclosed techniques may decode such a bitstream successfully and in a predictable and defined manner. Specifically, the techniques of this disclosure include methods of handling, by the video decoder, the decoding, as well as the output and reference properties, of leading pictures associated with the first coded picture. Alternatively, the techniques also include generating, by a video encoder, a conforming bitstream that excludes leading pictures associated with a first coded picture of the bitstream that is a non-IDR RAP picture from the bitstream, such that the bitstream may be successfully decoded by a video decoder in a predictable and defined manner.

In this disclosure, an IDR picture of a CVS may generally refer to a picture included within the CVS that is coded using intra-predictive coding, i.e., an "I" picture coded without referring to any other pictures within or outside of the CVS. Additionally, the IDR picture may refer to a picture for which all other pictures included within the CVS following the IDR picture according to a decoding order associated with the CVS are decoded without reference to any pictures preceding the IDR picture according to the decoding order. For example, consistent with some techniques (e.g., H.264/MPEG-4 Part 10/AVC; hereinafter "H.264/AVC"), a CVS may include an IDR picture as a first picture of the CVS according to a decoding order associated with the CVS, as well as one or more additional IDR pictures. As one example, the CVS may include one or more GOPs, wherein each GOP begins with an IDR picture, followed by one or more other, non-IDR pictures (e.g., so-called "P" and "B" pictures that are coded using inter-predictive coding based on forward and bi-directional prediction from other reference pictures).

Consistent with the above-described techniques (e.g., H.264/AVC), random access of a CVS may be accomplished by first decoding an IDR picture of the CVS, e.g., an IDR picture of a particular GOP included within the CVS. Because IDR pictures may be decoded without reference to any other pictures, as described above, according to these techniques, random access of the CVS may be performed on a GOP basis by first decoding an IDR picture located at the beginning of each GOP. In other words, according to some techniques (e.g., H.264/AVC), random access of a CVS may be performed only from an IDR picture included within the CVS. As such, in these techniques, for a first coded picture of a particular CVS in a conforming bitstream to be a RAP picture, the picture must be an IDR picture.

In contrast to the above-described techniques, in accordance with the techniques of this disclosure, random access of a bitstream starting from a non-IDR picture (e.g., a CRA picture) may be performed in a predictable and defined, or "standard," manner by conforming video decoders. As a result, the disclosed techniques may significantly improve interoperability of video encoder and video decoder systems and devices, as well as user experience, generally, for bitstream random access that may occur frequently in various video applications. For example, the techniques described herein may include at least one or more of the following novel aspects, compared to other techniques:

(1) detecting an occurrence of random access from a non-IDR RAP picture (e.g., a CRA picture);

2) identifying and decoding one or more pictures that follow the non-IDR RAP picture in a decoding order, but precede the non-IDR RAP picture in an output order (i.e., one or more "leading pictures" of the non-IDR RAP picture); and (3) specifying that each of the one or more leading pictures of the non-IDR RAP picture is not output even in the event a corresponding signaled output_flag is equal to true, or "1" (i.e., the output_flag indicates that the respective picture is to be output), and that the respective picture is not used as a reference picture for any other pictures that follow the non-IDR RAP picture in the decoding order and the output order.

As described above, according to some techniques (e.g., H.264/AVC), an IDR picture may serve as a conventional access point (e.g., a random access point, or "RAP" picture) for a CVS. For example, the IDR picture may be included at the beginning of an independently decodable portion of the CVS, sometimes referred to as a GOP. This implementation of random access of a CVS is sometimes referred to as a "closed GOP" implementation, wherein no pictures within a particular GOP refer to any pictures that occur prior to an IDR picture of the GOP, e.g., pictures included within a preceding GOP of the CVS, or a GOP of another, preceding CVS, according to a decoding order associated with the CVS. As already explained above, in this context, a GOP may be defined as an IDR picture followed by one or more "P" and/or "B" pictures.

In a so called "open GOP" implementation, a CRA picture serves a similar purpose as the IDR picture described above with reference to the closed GOP implementation. For example, in this context, a GOP may be defined as a CRA picture followed by one or more "P" and/or "B" pictures. However, in contrast to the closed GOP implementation, in the open GOP implementation, pictures included within a particular GOP may refer to pictures that occur prior to a CRA picture of the GOP, e.g., pictures included within a preceding GOP of the CVS, or a GOP of another, preceding CVS, according to a decoding order associated with the CVS. For example, consistent with the open GOP implementation, a "B" picture that follows a CRA picture (which, like the IDR picture, is an intra-predicted, or "I" picture) of one GOP of a CVS according to a decoding order associated with the CVS may refer to a picture (e.g., a "P" or a "B" picture) included within a preceding GOP of the CVS.

According to some techniques, a "B" picture of a CVS is conventionally predicted by referring to a picture that precedes the "B" picture and a picture that follows the "B" picture in an output order associated with the CVS. For example, the "B" picture of this example may refer to (i.e., use as a reference picture) the picture included within the preceding GOP, which may precede the "B" picture in an output order associated with the CVS, and also refer to (i.e., use as a reference picture) the CRA picture, which may follow the "B" picture in the output order. In other words, in this example, the "B" picture follows the CRA picture in the decoding order, but precedes the CRA picture in the output order. As such, the "B" picture may be considered a "leading picture" of the CRA picture. In other examples, however, the "B" picture may be any other type of a picture that is also a leading picture of the CRA picture, as defined above.

The above-described example illustrates at least one problem associated with the open GOP implementation described above. Specifically, in instances where random access of a CVS is performed from a CRA picture included within the CVS, leading pictures of the CRA picture cannot be correctly decoded. This is due to the fact that, in instances where the CRA picture is the first coded picture of the CVS, any pictures that precede the CRA picture in a decoding order associated with the CVS are not decoded, and, therefore, are unavailable as reference picture of the leading pictures. Accordingly, in the open GOP implementation described above, the leading pictures cannot be correctly decoded, and thus may impair user experience if displayed. For example, if decoded, the leading pictures may include erroneous video data, and, if displayed, may degrade the visual quality of the pictures themselves, as well as of the CVS in general. For the same reasons, in the open GOP implementation, other pictures of the CVS that follow the CRA picture in both the decoding order and the output order (e.g., "P" pictures) may not refer to the leading pictures (e.g., since these leading pictures, if decoded, may include erroneous video data), or to any other pictures that precede the CRA picture in the decoding order and the output order (e.g., since these pictures are not decoded, and are therefore unavailable as reference pictures).

Generally speaking, either of the above-described techniques (i.e., the closed GOP implementation using IDR pictures and the open GOP implementation using CRA pictures) may enable random access of a CVS of video data. However, according to some coding standards, such as, e.g., H.264/AVC, a bitstream that begins with a CRA picture is considered a "non-conforming" bitstream. For example, as described above, according to some techniques, such as, e.g., H.264/AVC, a bitstream must begin with an IDR picture. In other words, according to these techniques, only the closed GOP random access implementation described above may be supported. The techniques of this disclosure may enable a video decoder to handle such a non-conforming bitstream (i.e., a bitstream that starts with a CRA picture and conforms to the open GOP implementation). Stated another way, the techniques described herein aim to define such a bitstream as a "conforming" bitstream. In some examples, a conforming bitstream according to the techniques of this disclosure includes bitstreams that start with CRA pictures and conform to the open GOP implementation, as well as bitstreams that start with IDR pictures and conform to the closed GOP implementation.

As already explained above, one problem that is identified with respect to random access that occurs at a CRA picture relates to the fact that leading pictures of the CRA picture may not be correctly decoded, and, therefore, may impair user experience if displayed. The techniques of this disclosure may address this problem by enabling random access of a CVS from a CRA picture by performing the decoding, as well as manipulating the output and reference properties, of leading pictures associated with the CRA picture in a particular manner. Specifically, the techniques may include some or all of the following steps:

Step 1: Identifying one or more pictures of a CVS as leading pictures of a CRA picture of the CVS when a picture order count (POC) value of each of the one or more pictures is less than a POC value of the CRA picture (i.e., the respective picture precedes the CRA picture in an output order associated with the CVS), and when the respective picture follows the CRA picture in a decoding order associated with the CVS.

Step 2: Determining, for each of the one or more leading pictures, whether the respective leading picture references a picture that is not available for decoding.

Step 3: Generating, for each of the one or more leading pictures that is determined to reference a picture that is not available for decoding a virtual reference picture (e.g., generate a "middle" luma (or chroma) picture that has luma (or chroma) values that correspond to a middle of a luma (or chroma) value range associated with the CVS, e.g., a "gray" picture).

Step 4: Decoding each of the one or more leading pictures for which a virtual reference picture is generated using the corresponding generated virtual reference picture, as well as decoding any remaining leading pictures. (The decoding of the one or more leading pictures is performed in order to maintain original CVS timing parameters at the video decoder, e.g., within a DPB of the video decoder, although, as shown below, the decoded leading pictures may not be output or used as reference pictures for other pictures of the CVS).

Step 5: Setting an output_flag associated with each of the decoded one or more leading pictures to false, or "0," so as to not output the respective leading picture, even in the event a current output_flag is equal to true, or "1." (Alternatively, the techniques may include simply ignoring, or "masking" the current output_flag that is equal to true, or "1," so as to not output the respective leading picture).

Step 6: Preventing each of the decoded one or more leading pictures from being used as a prediction (i.e., a reference) picture for any other pictures of the CVS that follow the CRA picture in both the decoding order and the output order.

Additionally, the techniques described herein may be applicable to an encoding (e.g., video encoder 20), rather than a decoding (e.g., video decoder 30) device. For example, in instances where a first coded picture of a CVS comprises a CRA picture, an intelligent video encoder that conforms to the techniques of this disclosure may be configured to avoid sending any leading pictures of the CRA picture to a video decoder. As one example, the video encoder may be configured to send only "P" pictures that follow the CRA picture according to a decoding order associated with the CVS. To achieve this, the video encoder may be configured to generate a so-called bitstream "subset" by dropping all "access units"

or comparable sets of data that contain leading pictures associated with the CRA picture, in some examples. Accordingly, in the alternative example illustrated above, a video encoder, rather than a video decoder, may be configured handle (i.e., remove) leading pictures of a CRA of a CVS as part of generating a bitstream that includes the CVS, so as to improve interoperability and user experience for random access of the bitstream at the video decoder.

As such, consistent with the techniques described herein, a first coded picture of a CVS according to a decoding order associated with the CVS in a conforming bitstream may be an IDR picture or a CRA picture. In other words, the techniques of this disclosure may enable random access that occurs at a CRA picture of a CVS by defining a bitstream wherein a first coded picture of a CVS according to a decoding order associated with the CVS is a CRA picture as a conforming bitstream. For example, the techniques of this disclosure may be applicable to a particular coding standard (e.g., H.265/HEVC), or an extension of a coding standard (e.g., H.264/AVC). In any case, according to the disclosed techniques, such a bitstream may be a conforming bitstream. In other words, such a bitstream may be successfully decoded by a video decoder conforming to the techniques of this disclosure in a defined and predictable manner.

The following description provides additional information and examples relating to the techniques of this disclosure described above, as well as additional information and techniques.

Specifically, the techniques described herein may include one or more of the following novel aspects, compared to other techniques: (1) detecting an occurrence of random access from a non-IDR picture; (2) specifying that a picture is not output, even in the event a corresponding signaled output_flag for the picture is equal to true, or "1;" and (3) signaling updated "coded picture buffer" (CPB) removal time parameters for pictures following a non-IDR RAP picture in a decoding order, when the non-IDR RAP picture is a first coded picture of a bitstream, and when leading pictures associated with the first coded picture are not present. In some examples consistent with the disclosed techniques, the updated CPB removal time parameters may be indicated by an offset that applies to all pictures following the non-IDR RAP picture in the decoding order after performing random access from the non-IDR RAP picture.

The techniques described herein may be applicable to various video coding standards, including ITU-T H.261, ISO/IEC MPEG-1 Visual, ITU-T H.262 or ISO/IEC MPEG-2 Visual, ITU-T H.263, ISO/IEC MPEG-4 Visual, and ITU-T H.264 (also known as ISO/IEC MPEG-4 AVC), including its Scalable Video Coding (SVC) and Multiview Video Coding (MVC) extensions. In addition, the disclosed techniques may be applicable to the HEVC standard presently being developed by the JCT-VC of ITU-T Video Coding Experts Group (VCEG) and ISO/IEC Motion Picture Experts Group (MPEG). As explained above, one particular version of HEVC referred to in this disclosure is WD4 described in document JCTVC-F803.

Some DPB management techniques will now be described. According to some video coding techniques, various methods of DPB management may be implemented. As one example, decoded pictures used for predicting subsequent coded pictures, and for future output, may be buffered in a DPB. To efficiently utilize memory of a DPB, DPB management processes, including a storage process of decoded pictures into the DPB, a marking process of reference pictures, and output and removal processes of decoded pictures from the DPB, may be specified. DPB management may include at least the following aspects: (1) picture identification and reference picture identification; (2) reference picture list construction; (3) reference picture marking; (4) picture output from the DPB; (5) picture insertion into the DPB; and (6) picture removal from the DPB. Some introduction to reference picture marking and reference picture list construction is provided below.

As one example, reference picture list marking techniques will now be described. According to some video coding techniques, various methods of reference picture marking may be implemented. As one example, reference picture marking in H.264/AVC may be summarized as follows. A maximum number, which may be referred to as "M" (e.g., corresponding to syntax element num_ref_frames), of reference pictures used for inter-prediction may be indicated in an active sequence parameter set (SPS). When a reference picture is decoded, it may be marked as "used for reference." If the decoding of the reference picture causes more than "M" pictures to be marked as "used for reference," at least one picture may be marked as "unused for reference." Subsequently, the DPB removal process may remove pictures marked as "unused for reference" from the DPB, if the pictures are also not needed for output.

When a picture is decoded, it may be either a non-reference picture, or a reference picture. A reference picture can be a long-term reference picture, or a short-term reference picture, and, when marked as "unused for reference," the picture may become a non-reference picture.

H.264/AVC includes reference picture marking operations that change the status of reference pictures. For example, in H.264/AVC, there are two types of operations for the reference picture marking, namely the sliding window and the adaptive memory control. The operation mode for the reference picture marking is selected on a picture basis. As one example, the sliding window reference picture marking functions as a first-in-first-out (FIFO) queue with a fixed number of short-term reference pictures. In other words, a short-term reference picture with an earliest decoding time is first to be removed (i.e., marked as a picture "not used for reference"), in an implicit fashion. As another example, the adaptive memory control reference picture marking removes short-term or long-term pictures explicitly. It also enables switching the status of the short-term and long-term pictures.

As another example, reference picture list construction techniques will now be described. According to some video coding techniques, various methods of reference picture list construction may be implemented. As one example, typically, a reference picture list construction for a first or a second reference picture list of a "B" picture may include two steps: (1) reference picture list initialization, and (2) reference picture list reordering (which may be referred to as "modification"). The reference picture list initialization may be an explicit mechanism that puts reference pictures in a reference picture memory (also known as a DPB) into a list based on an order of POC (which, as explained above, is a "Picture Order Count," and is aligned with an output order, or a display order, of a picture) values.

The reference picture list reordering mechanism may modify a position of a picture that was put into the list during the reference picture list initialization to any new position, or put any reference picture in the reference picture memory in any position, even if the picture does not belong to the initialized list. Some pictures, after the reference picture list reordering (or modification), may be put in very "far" positions in the list. However, if a position of a picture exceeds a number of active reference pictures of the list, the picture may not be considered as an entry of the final reference picture list. The number of active reference pictures may be signaled in a slice header for each list.

Alternatively, a different approach to DPB management has been described in document "JCTVC-F493: Absolute Signaling of Reference Pictures," by Sjöberg et al., 6th Meeting, Torino, 2011 (referred to as JCTVC-F493 hereinafter), the entire contents of which are incorporated by reference herein.

Some reference picture set (RPS) techniques will now be described. For example, U.S. patent application Ser. No. 13/622,972, filed Sep. 19, 2012, the entire content of which is also incorporated by reference herein, describes an RPS, which includes, for each picture, a number of reference pictures that may be used by the current, or currently coded, picture and a picture following the currently coded picture in a decoding order. A detailed definition of an RPS may be provided as follows: a set of reference pictures associated with a picture, consisting of all reference pictures, excluding the associated picture itself, that may be used for inter-prediction of the associated picture or any picture following the associated picture in a decoding order, and that have syntax element temporal_id less than or equal to that of the associated picture.

Examples of a RAP and a corresponding RPS will now be described. As previously explained, in this disclosure, "random access" refers to a decoding of a CVS, starting from a coded picture that is not a traditional first coded picture, i.e., an IDR picture, in the CVS. A non-IDR RAP picture, which may be referred to as "picR," may be defined as a coded picture for which all of the following conditions are true:

(1) picR is not an IDR picture;
(2) let the POC of picR be "rPoc," and let "picA" be a picture in the same CVS and following picR in both a decoding order and an output order, and let the POC of picA be "aPoc." When random access is performed at picR, all pictures that are in the same CVS and follow picA in the output order can be correctly decoded.

In this example, for a non-IDR RAP picture picR, if the following condition is true, the picture may be referred to as a CRA picture: when random access is performed at picR, all pictures that are in the same CVS and follow picR in the output order can be correctly decoded. If the above condition is not true for a non-IDR RAP picture picR, the picture may be referred to as a gradual decoding refresh (GDR) picture. Additionally, for a CRA picture, a corresponding RPS may not contain any reference picture for the CRA picture, but may typically contain at least one picture for the pictures following the CRA picture in the decoding order.

Figure 4:
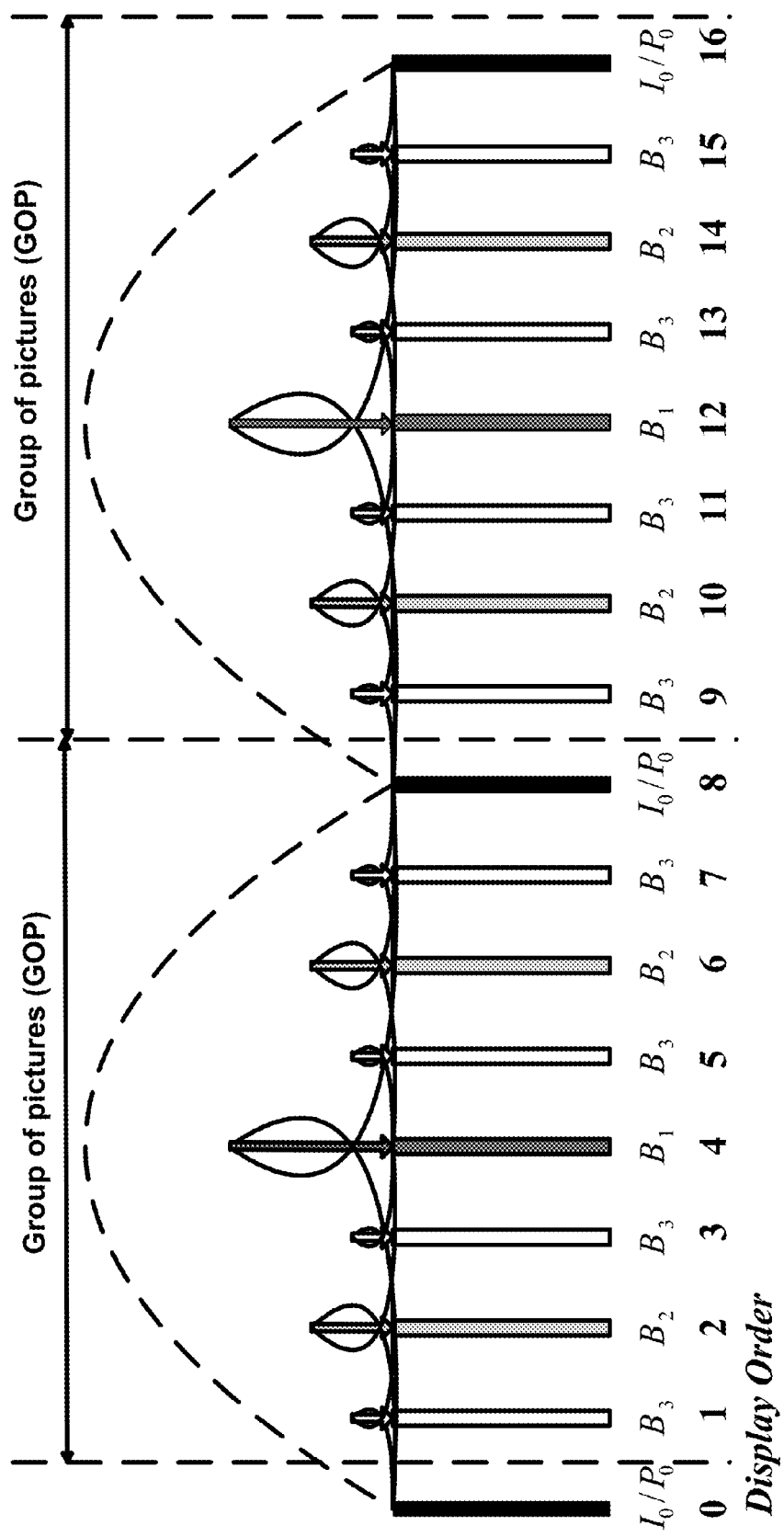
FIG. 4 is a conceptual diagram that illustrates an example of reference hierarchies among pictures of groups of pictures (GOPs) of video data, consistent with the techniques of this disclosure.

FIG. 4 is a conceptual diagram that illustrates an example of reference hierarchies among pictures of GOPs of video data, consistent with the techniques of this disclosure. In particular, FIG. 4 illustrates hierarchical "B" picture coding with four temporal levels and a GOP size of "8." As shown in FIG. 4, when a picture with a POC value equal to "8" is coded as intra—(i.e., an "I" picture), the picture can be a CRA picture. Based on the definition of the RPS, the RPS contains a picture with a POC value equal to "0" for the pictures following this picture in the decoding order.

Leading pictures and corresponding RPSs will now be described. As previously explained, pictures following a RAP picture in a decoding order, but preceding the RAP picture in a display order, may be referred to as corresponding "leading pictures" of the RAP picture. In the example of FIG. 4, the RPS's of the corresponding leading pictures of a CRA picture (i.e., the picture with a POC value of "8") are as shown in Table I below.

TABLE I

| POC | RPS |
|---|---|
| 4 | {0, 8} |
| 2 | {0, 8, 4} |
| 1 | {0, 8, 4, 2} |
| 3 | {8, 4, 2} |
| 6 | {8, 4, 2} |
| 5 | {8, 4, 6} |
| 7 | {8, 6} |

Picture output techniques will now be described. In HEVC WD4, each picture may be assigned an output_flag. When this flag is equal to false, or "0," the respective picture is not used for output, and hence will not be displayed.

An example of a CPB will now be described. A CPB may be needed by a video decoder for reception and buffering of access units, each containing a coded picture and associated network abstraction layer (NAL) units, before they are decoded. In HEVC WD4, for example, the CPB operations are missing, but the CPB operations as specified in H.264/AVC can nevertheless be applied. As one example, according to H.264/AVC, for a conforming bitstream, a list of conditions as specified in sub-clause C.3 in H.264/AVC may be satisfied in its entirety. Two of the bitstream conformance conditions are as follows:

(1) A CPB overflow is specified as a condition in which a total number of bits in a CPB is larger than a CPB size. The CPB may never overflow;
(2) A CPB underflow is specified as a condition in which $t_{r,n}(n)$ is less than "$t_{af}(n)$." When low_delay_hrd_flag is equal to "0," the CPB may never underflow.

Some potential problems with the above-described techniques will now be discussed. The various approaches described above, relating to random access that occurs at a CRA picture, have several drawbacks. As one example, in the event a leading picture is not present, a conforming decoder may not know whether the leading picture is lost due to transmission losses, or due to intentional picture drops (e.g., by a streaming server, intentionally for the random access operation). As another example, leading pictures may not be correctly decoded, and, therefore, may impair user experience if displayed. As yet another example, in the event some coded pictures are dropped intentionally, the resulting bitstream starting from a CRA picture may conflict with one or more bitstream conformance conditions, and, therefore, unforeseeable decoding behavior and uncontrollable decoding results may occur. For example, when all of the leading pictures are dropped, a next picture after the CRA picture in a decoding order becomes a coded picture after the last leading picture in the decoding order. Compared to the case where leading pictures are present, this next picture flows into a CPB earlier, and, consequently, its CPB final arrival time $t_{af}(n)$ becomes earlier. The CPB removal time derived from the syntax element cpb_removal_delay in the associated picture timing supplemental enhancement information (SEI) message may not change. Thus, CPB underflow will not occur. However, if a number of bits of this picture and the following pictures in the decoding order is significantly greater than that of the dropped leading pictures, CPB overflow may occur.

This disclosure describes several techniques that may, in some cases, reduce or eliminate some of the drawbacks described above. In particular, the techniques of this disclosure may solve the problems described above, related to random access from CRA pictures, by employing various methods to ensure that a bitstream for which a first coded picture is a CRA picture is conforming, regardless of whether leading pictures associated with the CRA picture are present. The disclosed techniques include at least the following aspects that may be used to implement the features described above.

As one example, a process for detection of an occurrence of random access may be optionally added. The detection of the occurrence of the random access for each picture and for each leading picture, whether it is targeted for decoding and/or output, may be performed by constructing a vanish picture set (VPS) which contains pictures that may not be correctly received and decoded due to random access, but will be correctly received and decoded in a normal case. As long as the VPS is not empty, the detection may be needed.

As another example, handling of an output property of leading pictures may be performed, such that, the leading pictures may not be used for output when random accessing, starting from an associated CRA picture, occurs.

As another example, decoding processes for a leading picture may be modified, such that, if a leading picture is received, only parsing of high level syntax and invocation of associated decoding processes, e.g., derivation of a reference picture set (RPS), may be performed, and decoding of such a picture may be skipped.

As another example, a bitstream restriction may be added, such that, even when a decoder starts decoding a CRA picture, and there are no leading pictures following the CRA picture, CPB conformance related information, including hypothetical reference decoder (HRD) parameters, picture buffering period SEI messages, and picture timing SEI messages, may be used to fulfill CPB constraints, and, therefore, no buffer overflow or underflow may occur.

As another example, an SEI message associated with a CRA picture may be signaled to include an additional set of CPB initial delay parameters, such that, when leading pictures are not present, CPB conformance constraints may be fulfilled when applying the additional set of CPB initial delay parameters. More specifically, in the picture buffering period SEI message, two sets of CPB initial delay parameters may be signaled if the current picture is a CRA picture.

The following examples demonstrate the above-described features of the techniques of this disclosure. For purpose of describing the following examples, the following terms are defined:

leading picture: A picture, associated with a CRA picture, that succeeds the CRA picture in a decoding order and precedes the CRA picture in output, or display order.

VPS: A set of reference pictures, associated with a CRA picture, that have a display order earlier than that of the CRA picture.

Examples of syntax, and, in particular, examples of buffering period SEI message syntax, will now be described.

TABLE II

| buffering_period( payloadSize ) { | C | Descriptor |
|---|---|---|
|   seq_parameter_set_id | 5 | ue(v) |
|   cra_para_present_flag | 5 | u(1) |
|   if( NalHrdBpPresentFlag ) { | | |
|     for( SchedSelIdx = 0; SchedSelIdx <= cpb_cnt_minus1; SchedSelIdx++ ) { | | |
|       initial_cpb_removal_delay[ SchedSelIdx ] | 5 | u(v) |
|       initial_cpb_removal_delay_offset[ SchedSelIdx ] | 5 | u(v) |
|       if ( cra_para_present_flag ) { | | |
|         update_initial_cpb_removal_delay[ SchedSelIdx ] | 5 | u(v) |
|         update_initial_cpb_removal_delay_offset[ SchedSelIdx ] | 5 | u(v) |
|       } | | |
|     } | | |
|   } | | |
|   if( VclHrdBpPresentFlag ) { | | |
|     for( SchedSelIdx = 0; SchedSelIdx <= cpb_cnt_minus1; SchedSelIdx++ ) { | | |
|       initial_cpb_removal_delay[ SchedSelIdx ] | 5 | u(v) |
|       initial_cpb_removal_delay_offset[ SchedSelIdx ] | 5 | u(v) |
|       if ( cra_para_present_flag ) { | | |
|         update_initial_cpb_removal_delay[ SchedSelIdx ] | 5 | u(v) |
|         update_initial_cpb_removal_delay_offset[ SchedSelIdx ] | 5 | u(v) |
|       } | | |
|     } | | |
|   } | | |
| } | | |

Additionally, examples of buffering period SEI message semantics are described below:

As one example, cra_para_present_flag equal to true, or "1," may indicate that another set of CPB initial delays is signalled when the current associated picture is a CRA picture. This flag equal to false, or "0," may indicate that no additional set of CPB initial delays is signalled. This flag may be equal to "0" when the associated picture is not a CRA picture.

As another example, update_initial_cpb_removal_delay [SchedSelIdx] may specify a delay for the SchedSelIdx-th CPB between the time of arrival in the CPB of the first bit of the coded data associated with the access unit associated with the buffering period SEI message, and the time of removal from the CPB of the coded data associated with the same access unit, for the first buffering period after HRD initialization. The syntax element may have a length in bits given by initial_cpb_removal_delay_length_minus1+1. It may be in units of a 90 kHz clock. Furthermore, update_initial_cpb_removal_delay[SchedSelIdx] may not be equal to "0" and may not exceed 90000*(CpbSize[SchedSelIdx]÷BitRate[SchedSelIdx]), the time-equivalent of the CPB size in 90 kHz clock units.

As another example, update_initial_cpb_removal_delay_offset[SchedSelIdx] may be used for the SchedSelIdx-th CPB in combination with the cpb_removal_delay to specify the initial delivery time of coded access units to the CPB. For example, update_initial_cpb_removal_delay_offset[SchedSelIdx] may be in units of a 90 kHz clock. The update_initial_cpb_removal_delay_offset[SchedSelIdx] syntax element may be a fixed length code whose length in bits is given by initial_cpb_removal_delay_length_minus1+1. This syntax element may not be used by decoders, and may be needed only for the delivery scheduler (HSS) specified in Annex C of HEVC WD4.

Examples of decoding processes will now be described. According to the techniques of this disclosure, the following decoding processes may be added and/or modified relative to decoding processes described in U.S. patent application Ser. No. 13/622,972, filed Sep. 19, 2012, the entire content of which is incorporated herein by reference.

As one example, VPS creation techniques will now be described. In some examples, VPS creation may occur right after invocation of a derivation process for an RPS when a current picture is a CRA picture. For example, in instances where the current picture is a CRA picture, if any picture in the RPS is not in a DPB, the VPS may be set as the current RPS. Otherwise, the VPS may be set to be empty.

As another example, leading picture identification techniques will now be described. In some examples, if a VPS is not empty, and a picture has an RPS which overlaps with the VPS, the picture may be identified as a leading picture.

As another example, leading picture decoding techniques will now be described. In some examples, decoding of a leading picture may be skipped by a conforming decoder.

As another example, leading picture output techniques will now be described. In some examples, for each leading picture, the output_flag may be set to "false," regardless of whether the value of output_flag in the slice header is equal to "0" or "1."

An HRD, and, in particular, operation of a CPB, will now be described. For example, the specifications in this portion of the disclosure may apply independently to each set of CPB parameters that is present, and to both Type I and Type II conformance.

As one example, timing of bitstream arrival will now be described. The HRD may be initialized at any one of the buffering period SEI messages. Prior to initialization, the CPB may be empty. In this example, after initialization, the HRD may not be initialized again by subsequent buffering period SEI messages. Also in this example, if the first access unit is a CRA access unit, and the leading pictures are not present and the cra_para_present_flag is equal to "1," useUpdatePara may be set to "1." Otherwise, useUpdatePara may be set to "0."

For example, if useUpdatePara is equal to "0," InitialCpbRemovalDelay[SchedSelIdx] may be set to initial_cpb_removal_delay[SchedSelIdx] and InitialCpbRemovalDelayOffset[SchedSelIdx] may be set to initial_cpb_removal_delay_offset[SchedSelIdx]. Otherwise, InitialCpbRemovalDelay[SchedSelIdx] may be set to update_initial_cpb_removal_delay[SchedSelIdx] and InitialCpbRemovalDelayOffset[SchedSelIdx] may be set to update_initial_cpb_removal_delay_offset[SchedSelIdx], wherein initial_cpb_removal_delay[SchedSelIdx], initial_cpb_removal_delay_offset[SchedSelIdx], update_initial_cpb_removal_delay[SchedSelIdx], and update_initial_cpb_removal offset[SchedSelIdx] may be specified in the buffering period SEI message associated with the CRA access unit.

Furthermore, the access unit that is associated with the buffering period SEI message that initializes the CPB may be referred to as access unit "0." All other access units are referred to as access unit "n," with "n" being incremented by 1 for the next access unit in a decoding order. In this example, the time at which the first bit of access unit n begins to enter the CPB may be referred to as an initial arrival time $t_{ai}(n)$.

In one example, the initial arrival time of access units may be derived as follows:

(1) if the access unit is access unit 0, $t_{ai}(0)=0$;
(2) otherwise (the access unit is access unit n with n>0), the following may apply:
(a) if cbr_flag[SchedSelIdx] is equal to "1," the initial arrival time for access unit n may be equal to a final arrival time (which is derived below) of access unit n−1, i.e., $$t_{ai}(n)=t_{af}(n-1) \quad \text{EQ. 1}$$

(b) otherwise, if cbr_flag[SchedSelIdx] is equal to "0," and access unit n is not the first access unit of a subsequent buffering period, the initial arrival time for access unit n may be derived by:

$$t_{ai}(n)=\text{Max}(t_{af}(n-1), t_{ai,earliest}(n)) \quad \text{EQ. 2}$$

where $t_{ai,earliest}(n)$ is given as follows:

$$t_{ai,earliest}(n)=t_{r,n}(n)-(\text{InitialCpbRemovalDelay[SchedSelIdx]}+\text{InitialCpbRemovalDelayOffset[SchedSelIdx]})\div 90000 \quad \text{EQ. 3}$$

with $t_{r,n}(n)$ being the nominal removal time of access unit n from the CPB as specified in sub-clause C.1.2 of HEVC WD4, in some examples;

(c) otherwise (if cbr_flag[SchedSelIdx] is equal to "0," and the subsequent access unit n is the first access unit of a subsequent buffering period), the initial arrival time for the access unit n may be derived by:

$$t_{ai}(n)=t_{r,n}(n)-(\text{InitialCpbRemovalDelay[SchedSelIdx]}\div 90000) \quad \text{EQ. 4}$$

with InitialCpbRemovalDelay[SchedSelIdx] being specified in the buffering period SEI message associated with access unit n, in some examples.

In this example, the final arrival time for access unit n may be derived by:

$$t_{af}(n)=t_{ai}(n)+b(n)\div\text{BitRate[SchedSelIdx]} \quad \text{EQ. 5}$$

where b(n) may be the size in bits of access unit n, counting the bits of the Type I bitstream for Type I conformance, or the bits of the Type II bitstream for Type II conformance.

In some examples, the values of SchedSelIdx, BitRate[SchedSelIdx], and CpbSize[SchedSelIdx] may be constrained as follows:

(1) if access unit n and access unit n−1 are part of different CVSs, and the content of the active SPSs of the two CVSs differ, the HSS may select a value SchedSelIdx1 of SchedSelIdx from among the values of SchedSelIdx provided for the CVS containing access unit n that results in a BitRate[SchedSelIdx1] or CpbSize[SchedSelIdx1] for the second of the two CVSs (which contains access unit n−1) that differs from the value of BitRate[SchedSelIdx0] or CpbSize[SchedSelIdx0] for the value SchedSelIdx0 of SchedSelIdx that was in use for the CVS containing access unit n−1;

(2) otherwise, the HSS may continue to operate with the previous values of SchedSelIdx, BitRate[SchedSelIdx], and CpbSize[SchedSelIdx].

In other examples, when the HSS selects values of BitRate[SchedSelIdx] or CpbSize[SchedSelIdx] that differ from those of the previous access unit, the following may apply:

(1) the variable BitRate[SchedSelIdx] may come into effect at time $t_{ai}(n)$;

(2) the variable CpbSize[SchedSelIdx] may come into effect as follows:

(a) if the new value of CpbSize[SchedSelIdx] exceeds the old CPB size, it may come into effect at time $t_{ai}(n)$;

(b) otherwise, the new value of CpbSize[SchedSelIdx] may come into effect at the time $t_r(n)$.

As another example, timing of coded picture removal will now be described. For example, for access unit 0, the nominal removal time of the access unit from the CPB may be specified by:

$$t_{r,n}(0)=\text{InitialCpbRemovalDelay[SchedSelIdx]}\div 90000 \quad \text{EQ. 6}$$

Furthermore, for the first access unit of a buffering period that does not initialize the HRD, the nominal removal time of the access unit from the CPB may be specified by:

$$t_{r,n}(n)=t_{r,n}(n_b)+t_c*\text{cpb\_removal\_delay}(n) \quad \text{EQ. 7}$$

where $t_{r,n}(n_b)$ may be the nominal removal time of the first picture of the previous buffering period, and cpb_removal_delay(n) may be specified in the picture timing SEI message associated with access unit n.

Additionally, when an access unit n is the first access unit of a buffering period, $n_b$ may be set equal to n at the removal time of access unit n.

Also, the nominal removal time $t_{r,n}(n)$ of an access unit n that is not the first access unit of a buffering period may be given by:

$$t_{r,n}(n)=t_{r,n}(n_b)+t_c*\text{cpb\_removal\_delay}(n) \quad \text{EQ. 8}$$

Additionally, the removal time of access unit n may be specified as follows:
(1) if low_delay_hrd_flag is equal to "0" or $t_{r,n}(n) >= t_{af}(n)$, the removal time of access unit n may be specified by:

$$t_r(n)=t_{r,n}(n) \quad \text{EQ. 9}$$

(2) otherwise (if low_delay_hrd_flag is equal to 1 and $t_{r,n}(n) < t_{af}(n)$), the removal time of access unit n may be specified by:

$$t_r(n)=t_{r,n}(n)+t_c*\text{Ceil}((t_{af}(n)-t_{r,n}(n))\div t_c) \quad \text{EQ. 10}$$

In this example, the latter case indicates that the size of access unit n, b(n), is so large that it prevents removal at the nominal removal time.

As another example, bitstream conformance will now be described. The disclosure of sub-clause C.3 of H.264/AVC may apply to the techniques described below, with the following changes included: a first coded picture, in a decoding order, of a conforming bitstream may be an IDR picture or a CRA picture. For a conforming bitstream starting with a CRA picture, a bitstream subset generated by dropping access units that contain all leading pictures associated with the starting CRA picture may still be a conforming bitstream.

The following description includes alternative examples of the techniques of this disclosure described above. For example, various alternative implementations of certain aspects of this disclosure are possible, and some are described as follows. The following alternative implementations are described with reference to different aspects of the techniques of the disclosure. However, any combination of the implementations for the different aspects may also form implementations consistent with the techniques of this disclosure.

The following alternative examples relate to the modification of a VPS.

As one example, aVPS definition is provided as follows: A set of reference pictures associated with a picture, consisting of all reference pictures, which are in a current RPS and may not be correctly decoded when random access from a closest CRA picture, which precedes the picture in a decoding order, occurs.

The following is one alternative example of VPS modification. In this example, in the event a VPS is not empty, the following may apply:

(1) before a current picture is decoded, each picture in the VPS may be checked;
 (a) if the picture is in the RPS, it may be kept in the VPS;
 (b) otherwise, it may be removed from the VPS;
(2) in the event the VPS of a current picture and the RPS of the current picture have overlap, the current picture may be inserted into the VPS, if it is a reference picture, after the current picture is decoded.

In some examples, if a picture is not a CRA picture, and a VPS is not empty, each picture in a current RPS may be either in the VPS or in the DPB.

The following is another alternative example of VPS modification. In this example, in the event a VPS is not empty, the following may apply:

(1) before a picture is decoded, each picture in the VPS may be checked;
 (a) if the picture is in the RPS and belongs to one of the subsets RefPicSetStCurr0, RefPicSetStCurr1 and RefPicSetLtCurr, it may be kept in the VPS;
 (b) otherwise, it may be removed from the VPS;
(2) in the event the VPS of a current picture and the RPS of the current picture have overlap, the current picture may be inserted into the VPS, if it is a reference picture, after the current picture is decoded.

The following is another alternative example of VPS modification. In this example, in the event a picture has a display order larger than a CRA picture, and a VPS is not empty, the following may apply:

(1) in the event at least one picture in an RPS belongs to the VPS, the VPS may be kept unchanged;
(2) in the event no picture in the RPS belongs to the VPS, the VPS may be set to empty.

In this example, the VPS may only change twice during each random access. The first time, it may be filled with pictures on which the leading pictures may depend. The second time, it may be set to empty.

In the example of FIG. 4, if picture "8" is used for random access, the VPS may be {8}. In this example, only after the RPS of picture "16" is created, VPS may be set to empty. In this example, pictures with a display order less than that of the CRA picture may be skipped for decoding and output, as long as the VPS is not empty. This may be described as a different, or alternative, approach for "Leading Picture Identification."

An alternative example of creating a vanish picture will now be described. In this example, in the event a picture is detected as a vanish picture, it may be created as a copy of a picture in a DPB which has the closest display order (POC distance) to the vanish picture. If two pictures have the same POC distance, the one with a smaller POC may be used.

An alternative example of leading picture decoding will now be described. As one example, a leading picture may be decoded, if none of the pictures in RefPicSetStCurr0, RefPicSetStCurr1 or RefPicSetLtCurr belongs to the VPS. As another example, a leading picture may always be decoded, especially when each vanish picture is available in the DPB, although with drift.

An alternative example of leading picture output will now be described. As one example, in the event a leading picture is correctly decoded, output_flag may be set to "1." Otherwise, the output_flag may be set to "0." As another example, only the continuous leading pictures immediately before the CRA picture in an output order, if they are all correctly decoded, may have output_flag values set to "1," and other leading pictures may have output_flag values set to "0."

An alternative example of the removal time offset, and in particular, buffering period SEI message syntax, will now be described.

TABLE III

| buffering_period( payloadSize ) { | C | Descriptor |
|---|---|---|
|     seq_parameter_set_id | 5 | ue(v) |
|     cra_para_present_flag | 5 | u(1) |
|     if( NalHrdBpPresentFlag ) { | | |
|         for( SchedSelIdx = 0; SchedSelIdx <= cpb_cnt_minus1; SchedSelIdx++ ) { | | |
|             initial_cpb_removal_delay[ SchedSelIdx ] | 5 | u(v) |
|             initial_cpb_removal_delay_offset[ SchedSelIdx ] | 5 | u(v) |
|             if ( cra_para_present_flag ) | | |
|                 random_access_removal_delay_offset[ SchedSelIdx ] | 5 | u(v) |
|         } | | |
|     } | | |
|     if( VclHrdBpPresentFlag ) { | | |
|         for( SchedSelIdx = 0; SchedSelIdx <= cpb cnt minus 1; SchedSelIdx++ ) { | | |
|             initial_cpb_removal_delay[ SchedSelIdx ] | 5 | u(v) |
|             initial_cpb_removal_delay_offset[ SchedSelIdx ] | 5 | u(v) |
|             if ( cra_para_present_flag ) | | |
|                 random_access_removal_delay_offset[ SchedSelIdx ] | 5 | u(v) |
|         } | | |
|     } | | |
| } | | |

Alternatively, in other examples, the offset may be signaled in a different SEI message that is only associated with a CRA (or non-IDR random access) picture, for which the syntax is provided below.

An example of CPB removal delay offset SEI message syntax will now be described.

TABLE IV

| cpb_removeal_delay_offset( payloadSize ) { | C | Descriptor |
|---|---|---|
|     seq_parameter_set_id | 5 | ue(v) |
|     if( NalHrdBpPresentFlag ) | | |
|         for( SchedSelIdx = 0; SchedSelIdx <= cpb_cnt_minus1; SchedSelIdx++ ) | | |
|             random_access_removal_delay_offset[ SchedSelIdx ] | 5 | u(v) |
|     if( VclHrdBpPresentFlag ) | | |
|         for( SchedSelIdx = 0; SchedSelIdx <= cpb_cnt_minus1; SchedSelIdx++ ) { | | |
|             random_access_removal_delay_offset[ SchedSelIdx ] | 5 | u(v) |
| } | | |

Additionally, buffering period SEI message semantics are described below.

As one example, cra_para_present_flag equal to "1" may indicate the presence of the random_access_removal_delay_offset[SchedSelIdx] syntax element. This flag equal to "0" may indicate the absence of the random_access_removal_delay_offset[SchedSelIdx] syntax element.

As another example, random_access_removal_delay_offset[SchedSelIdx] may specify a CPB removal time offset for the SchedSelIdx-th CPB. For example, it may be in units of a 90 kHz clock. Additionally, random_access_removal_delay_offset[SchedSelIdx] may not exceed initial_cpb_removal_delay[SchedSelIdx]+initial_cpb_removal_delay_offset [SchedSelIdx]. In some examples, when not present, the value may be inferred to be equal to "0."

An example of CPB removal delay offset SEI message semantics will now be described. In some examples, such an SEI message may only be present for a CRA picture, and may only take effect when the CRA is used for random access and its corresponding leading pictures are not present in the bitstream. As one example, random_access_removal_delay_offset[SchedSelIdx] may specify a CPB removal time offset for the SchedSelIdx-th CPB. For example, it may be in units of a 90 kHz clock. Additionally, random_access_removal_delay_offset[SchedSelIdx] may not exceed initial_cpb_removal_delay[SchedSelIdx]+initial_cpb_removal_delay_offset[SchedSelIdx]. In some examples, when not present, the value may be inferred to be equal to "0."

An example of operation of a CPB will now be described. The specifications in this portion of the disclosure may apply independently to each set of CPB parameters that is present, and to both Type I and Type II conformance.

As one example, timing of bitstream arrival will now be described. For example, the HRD may be initialized at any one of the buffering period SEI messages. Prior to initialization, the CPB may be empty. In this example, after initialization, the HRD may not be initialized again by subsequent buffering period SEI messages. Also in this example, the access unit that is associated with the buffering period SEI message that initializes the CPB may be referred to as access unit 0. All other access units are referred to as access unit n, with n being incremented by 1 for the next access unit in a decoding order.

In this example, if the first access unit is a CRA access unit, and the leading pictures are not present and the cra_para_present_flag is equal to "1," useUpdatePara may be set to "1."

Otherwise, useUpdatePara may be set to "0." Furthermore, if useUpdatePara is equal to "1," DelayOffset[SchedSelIdx] may be set to random_access_removal_delay_offset[SchedSelIdx]. Otherwise, DelayOffset[SchedSelIdx] may be set to "0." Additionally, the time at which the first bit of access unit n begins to enter the CPB may be referred to as the initial arrival time $t_{ai}(n)$. In some examples, the initial arrival time of access units may be derived as follows:

(1) If the access unit is access unit 0, $t_{ai}(0)=0$.

(2) Otherwise (if the access unit is access unit n with n>0), the following may apply:

(a) If cbr_flag[SchedSelIdx] is equal to "1," the initial arrival time for access unit n may be equal to the final arrival time (which is derived below) of access unit n−1, i.e., $$t_{ai}(n)=t_{af}(n-1) \qquad \text{EQ. 11}$$

(b) Otherwise, if cbr_flag[SchedSelIdx] is equal to "0," and access unit n is not the first access unit of a subsequent buffering period, the initial arrival time for access unit n may be derived by:

$$t_{ai}(n)=\text{Max}(t_{af}(n-1), t_{ai,earliest}(n)) \qquad \text{EQ. 12}$$

where $t_{ai,earliest}(n)$ may be given as follows:

$$t_{ai,earliest}(n)=t_{r,n}(n)-(\text{initial\_cpb\_removal\_delay}[\text{SchedSelIdx}]+\text{initial\_cpb\_removal\_delay\_offset}[\text{SchedSelIdx}])\div 90000 \qquad \text{EQ. 13}$$

with $t_{r,n}(n)$ being the nominal removal time of access unit n from the CPB as specified in sub-clause C.1.2 of HEVC WD4, and initial_cpb_removal_delay[SchedSelIdx] and initial_cpb_removal_delay_offset[SchedSelIdx] being specified in the previous buffering period SEI message.

(c) Otherwise (if cbr_flag[SchedSelIdx] is equal to "0," and the subsequent access unit n is the first access unit of a subsequent buffering period), the initial arrival time for the access unit n may be derived by:

$$t_{ai}(n)=t_{r,n}(n)-(\text{initial\_cpb\_removal\_delay}[\text{SchedSelIdx}]\div 90000) \qquad \text{EQ. 14}$$

with initial_cpb_removal_delay[SchedSelIdx] being specified in the buffering period SEI message associated with access unit n. In this example, the final arrival time for access unit n may be derived by:

$$t_{af}(n)=t_{ai}(n)+b(n)\div\text{BitRate}[\text{SchedSelIdx}] \qquad \text{EQ. 15}$$

where b(n) may be the size in bits of access unit n, counting the bits of the Type I bitstream for Type I conformance, or the bits of the Type II bitstream for Type II conformance.

Furthermore, the values of SchedSelIdx, BitRate[SchedSelIdx], and CpbSize[SchedSelIdx] may be constrained as follows:

(1) If access unit n and access unit "n−1" are part of different CVSs, and the content of the active SPSs of the two CVSs differ, the HSS may select a value SchedSelIdx) of SchedSelIdx from among the values of SchedSelIdx provided for the CVS containing access unit n that results in a BitRate[SchedSelIdx1] or CpbSize[SchedSelIdx1] for the second of the two CVSs (which contains access units n−1) that differs from the value of BitRate[SchedSelIdx0] or "CpbSize[SchedSelIdx0]" for the value SchedSelIdx0 of SchedSelIdx that was in use for the CVS containing access unit n−1.

(2) Otherwise, the HSS may continue to operate with the previous values of SchedSelIdx, BitRate[SchedSelIdx] and CpbSize[SchedSelIdx].

Additionally, when the HSS selects values of BitRate[SchedSelIdx] or CpbSize[SchedSelIdx] that differ from those of the previous access unit, the following may apply:

(1) The variable BitRate[SchedSelIdx] may come into effect at time $t_{ai}(n)$; and (2) The variable CpbSize[SchedSelIdx] may come into effect as follows:

(a) If the new value of CpbSize[SchedSelIdx] exceeds the old CPB size, it may come into effect at time $t_{ai}(n)$, (b) Otherwise, the new value of CpbSize[SchedSelIdx] may come into effect at the time $t_r(n)$.

As another example, timing of coded picture removal will now be described. In some examples, it may be assumed that the nominal CPB removal time and the CPB removal time of a coded picture are calculated immediately after the previous coded picture is removed from the CPB, or, for access unit 0, when the HRD is initialized.

For example, for access unit 0, the nominal removal time of the access unit from the CPB may be specified by:

$$t_{r,n}(0)=\text{initial\_cpb\_removal\_delay}[\text{SchedSelIdx}]\div 90000 \qquad \text{EQ. 16}$$

At the removal time of access unit 0, the variable $n_b$ may be set equal to "0." Immediately after the removal of access unit 0 from the CPB, $t_{r,n}(0)$ may be set to equal to $t_{r,n}(0)-(\text{DelayOffset}[\text{SchedSelIdx}]\div 90000)$.

In this example, the effective CPB removal time of access unit 0 may not be shifted, but for all pictures after access unit 0 in a decoding order, the effective CPB removal time may be shifted earlier by (DelayOffset[SchedSelIdx]÷90000).

Furthermore, for the first access unit of a buffering period that does not initialize the HRD, the nominal removal time of the access unit from the CPB may be specified by:

$$t_{r,n}(n)=t_{r,n}(n_b)+t_c*\text{cpb\_removal\_delay}(n) \qquad \text{EQ. 17}$$

where $t_{r,n}(n_b)$ may be the nominal removal time of the first picture of the previous buffering period, and cpb_removal_delay(n) may be specified in the picture timing SEI message associated with access unit n.

Additionally, when an access unit n is the first access unit of a buffering period that does not initialize the HRD, $n_b$ may be set equal to "n" at the removal time of access unit n. Moreover, the nominal removal time $t_{r,n}(n)$ of an access unit n that is not the first access unit of a buffering period may be given by:

$$t_{r,n}(n)=t_{r,n}(n_b)+*\text{cpb\_removal\_delay}(n) \qquad \text{EQ. 18}$$

For example, the removal time of access unit n may be specified as follows:

(1) If low_delay_hrd_flag is equal to "0," or $t_{r,n}(n)>=t_{af}(n)$, the removal time of access unit n may be specified by:

$$t_r(n)=t_{r,n}(n) \qquad \text{EQ. 19}$$

(2) Otherwise (if low_delay_hrd_flag is equal to "1," and $t_{r,n}(n)<t_{af}(n)$), the removal time of access unit n may be specified by:

$$t_r(n)=t_{r,n}(n)+t_c*\text{Ceil}((t_{af}(n)-t_{r,n}(n))\div t_c) \qquad \text{EQ. 20}$$

In this example, the latter case indicates that the size access unit n, b(n), is so large that it prevents removal at the nominal removal time.

Another example of the techniques of this disclosure specifies decoding processes for leading pictures that have missing reference pictures. In this example, only a bitstream starting with a CRA picture for which the leading pictures are present in the bitstream is specified as a conforming bitstream. In particular, this example corresponds to some of the techniques described in HEVC WD5, and includes the following changes to these techniques of HEVC WD5, as described in detail below.

In this example, a first coded picture in a bitstream may be an IDR picture or a CRA picture. As previously explained, the term "leading picture," as used in this disclosure, may be defined as follows: A coded picture associated with a CRA picture that follows the CRA picture in a decoding order, and precedes the CRA picture in an output order. For example, if the first coded picture in the bitream is a CRA picture, and the current, or currently coded, picture is a leading picture of the first coded picture in the bitstream, the output_flag of the currently coded picture may be set to be equal to false, or "0" (e.g., regardless of the value of the output_flag in the NAL unit header of the video coding layer (VCL) NAL units of the coded picture). In this example, the decoding process for generating missing reference pictures (as shown below) may be invoked (e.g., this process may only be needed to be invoked for one slice of a picture).

Furthermore, there may be one or more reference pictures that are included in the RPS, but that are not present in the DPB. Entries in RefPicSetStFoll or RefPicSetLtFoll equal to "no reference picture" may be ignored if the first coded picture in the bitstream is an IDR picture, or if the first coded picture in the bitstream is a CRA picture and the currently coded picture is not a leading picture of the first coded picture in the bitstream. For example, an unintentional picture loss may be inferred for each entry in RefPicSetStCurr0, RefPicSetStCurr1, and RefPicSetLtCurr equal to "no reference picture."

Additionally, if the first coded picture in the bitstream is an IDR picture, or if the first coded picture in the bitstream is a CRA picture and the currently coded picture is not a leading picture of the first coded picture in the bitstream, there may be no entry in RefPicSetStCurr0, RefPicSetStCurr1, or RefPicSetLtCurr equal to "no reference picture.

The decoding process for generating missing reference pictures may be specified as follows. This process may be invoked once per coded picture, after the invocation of the decoding process for RPS (as specified in sub-clause 8.2.2 in HEVC WD5, in document "JCTVC-G1103," for example, in version "d9" of the document). When the first coded picture in the bitstream is a CRA picture, and the currently coded picture is a leading picture of the first coded picture in the bitstream, the following may apply:

1) For each RefPicSetStCurr0[i], with "i" being in the range of "0" to NumPocStCurr0-1, inclusive, that is equal to "no reference picture," a reference picture may be generated by invocation of the decoding process for generating a missing reference picture, as specified below. Additionally, the following may apply:
  A) The value of PicOrderCntVal for the generated reference picture may be set to PocStCurr0[i].
  B) The value of output_flag for the generated reference picture may be set to "0."
  C) The generated reference picture may be marked as "used for short-term reference."
  D) RefPicSetStCurr0[i] may be set to be the generated reference picture.
2) For each RefPicSetStCurr1[i], with "i" being in the range of "0" to NumPocStCurr1-1, inclusive, that is equal to "no reference picture," a reference picture may be generated by invocation of the decoding process for generating a missing reference picture, as specified below. Additionally, the following may apply:
  A) The value of PicOrderCntVal for the generated reference picture may be set to PocStCurr1[i].
  B) The value of output_flag for the generated reference picture may be set to "0."
  C) The generated reference picture may be marked as "used for short-term reference."
  D) RefPicSetStCurr1[i] may be set to be the generated reference picture.
3) For each RefPicSetLtCurr[i], with "i" being in the range of "0" to NumPocLtCurr-1, inclusive, that is equal to "no reference picture," a reference picture may be generated by invocation of the decoding process for generating a missing reference picture, as specified below. Additionally, the following may apply:
  A) The value of pic_order_cnt_lsb for the generated reference picture may be set to PocLtCurr[i].
  B) The value of output_flag for the generated reference picture may be set to "0."
  C) The generated reference picture may be marked as "used for long-term reference."
  D) RefPicSetLtCurr[i] may be set to be the generated reference picture.

In some examples, the decoding process for generating a missing reference picture may be specified as follows:
1) The value of each element in the sample array $S_L$ may be set to $1<<(BitDepth_Y-1)$.
2) The value of each element in the sample arrays $S_{Cb}$ and $S_{Cr}$ may be set to $1<<(BitDepth_C-1)$.
3) The prediction mode PredMode for each minimum CU may be set to MODE_INTRA.

Alternatively, each LCU may be split into a minimum CU, and the minimum CU may be set to MODE_INTRA.

Alternatively, each LCU may be set to be MODE_INTRA.

Accordingly, in some examples consistent with the techniques of this disclosure, video encoder 20 of source device 12 may be configured to encode one or more pictures of video data. In these examples, video decoder 30 of destination device 14 may be configured to receive the encoded one or more pictures from video encoder 20, e.g., as part of an encoded bitstream generated by video encoder 20 and received by video decoder 30, and decode the one or more pictures.

As one example, video decoder 30 may be configured to receive a bitstream that includes one or more pictures of a CVS. Video decoder 30 may be further configured to decode a first picture of the one or more pictures according to a decoding order associated with the CVS. In this example, the first picture may be a RAP picture that is not an IDR picture. Video decoder 30 may also be configured to decode at least one of the one or more pictures, other than the first picture, following the first picture according to the decoding order, based on the decoded first picture.

As another example, video encoder 20 may be configured to generate a bitstream that includes one or more pictures of a CVS. In this example, a first picture of the one or more pictures according to a decoding order associated with the CVS may be a RAP picture that is not an IDR picture. Also in this example, to generate the bitstream, video encoder 20 may be configured to avoid including at least one of the one or more pictures, other than the first picture, that corresponds to a leading picture associated with the first picture, in the bitstream. For example, the leading picture may be a picture that follows the first picture according to the decoding order and precedes the first picture according to a display order associated with the CVS. In this example, the first picture may be decodable, i.e., capable of being decoded, for example, by video decoder 30. Also in this example, at least one of the one or more pictures, other than the first picture, following the first picture according to the decoding order, also may be decodable, based on the decoded first picture. For example, the at least one of the one or more pictures, other than the first picture, following the first picture according to the decoding order may be decodable using a decoded version of the first picture as a reference picture.

In this manner, video decoder 30 may decode a bitstream, e.g., generated by video encoder 20, that includes one or more pictures of video data and begins with a non-IDR RAP picture, in a predictable and defined manner, as specified by the techniques of this disclosure. As a result, there may be a relative improvement in user experience when performing random access of a bitstream that includes one or more pictures of video data, when using the disclosed techniques. In particular, video decoder 30 may be able to decode the bitstream with relatively greater granularity. In other words, video decoder 30 may be able to randomly access the bitstream at relatively more points, or pictures (i.e., non-IDR pictures) of the bitstream, compared to other techniques (e.g., techniques that allow random access of a bitstream only from IDR pictures. Additionally, there may be a relative improvement in visual quality of one or more pictures of a CVS included in the bitstream, and/or of the CVS as a whole, when using the techniques of this disclosure.

Video encoder 20 and video decoder 30 each may be implemented as any of a variety of suitable encoder or decoder circuitry, as applicable, such as one or more microprocessors, DSPs, ASICs, FPGAs, discrete logic circuitry, software, hardware, firmware, or any combinations thereof. Each of video encoder 20 and video decoder 30 may be included in one or more encoders or decoders, either of which may be integrated as part of a combined video encoder/decoder (CO-DEC). An apparatus including video encoder 20 and/or video decoder 30 may comprise an integrated circuit (IC), a microprocessor, and/or a wireless communication device, such as a cellular telephone.

Figure 2:
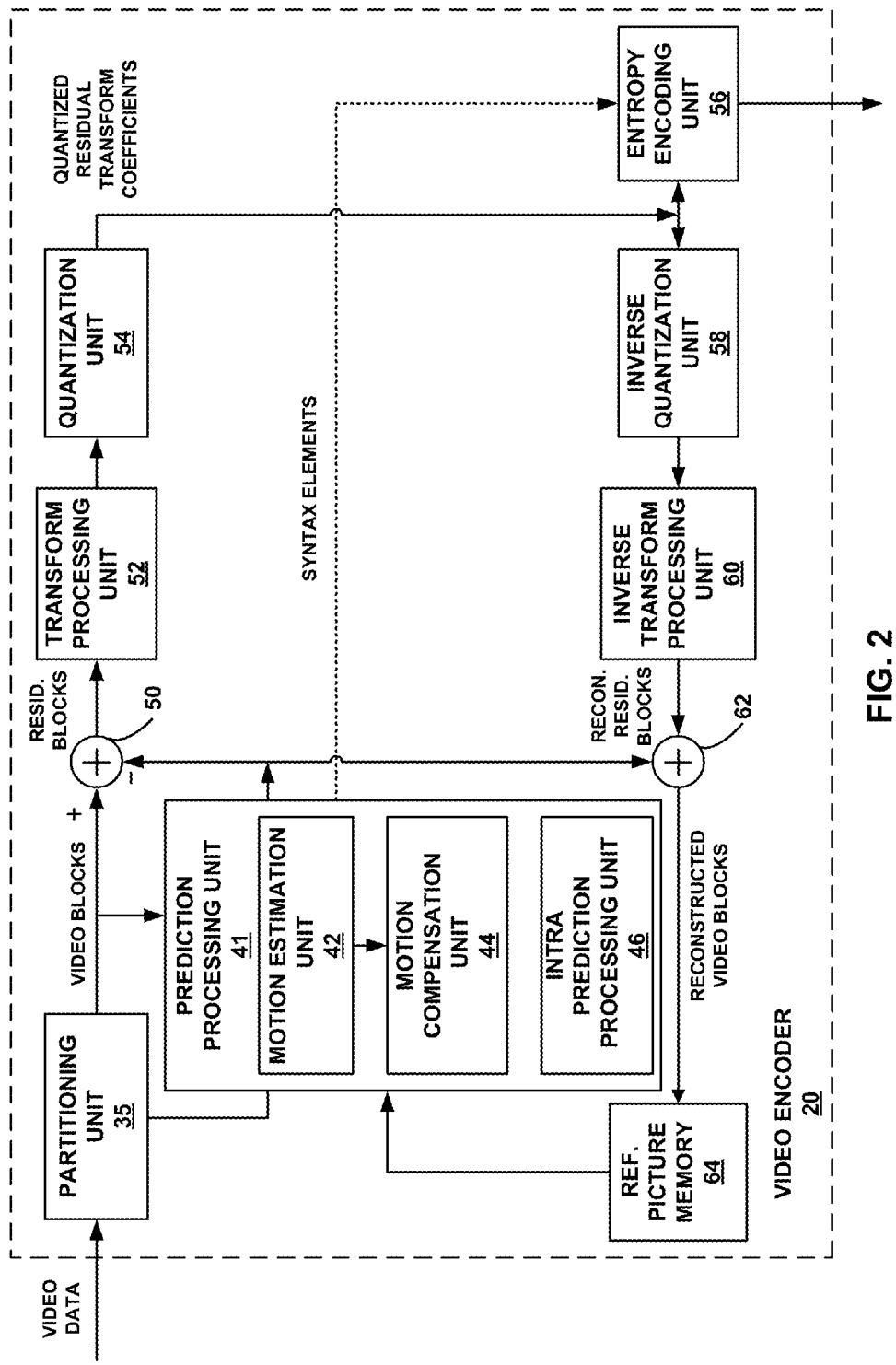
FIG. 2 is a block diagram that illustrates an example of a video encoder that may perform the techniques for random access with advanced DPB management, consistent with the techniques of this disclosure.

FIG. 2 is a block diagram that illustrates an example of a video encoder that may perform the techniques for random access with advanced DPB management, consistent with the techniques of this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 2, video encoder 20 includes mode select unit 40, motion estimation unit 42, motion compensation unit 44, intra-prediction processing unit 46, reference picture memory 66, summer 50, transform processing unit 52, quantization unit 54, and entropy encoding unit 56. For video block reconstruction, video encoder 20 also includes inverse quantization unit 58, inverse transform processing unit 60, and summer 62. A deblocking filter 64 is also included to filter block boundaries to remove blockiness artifacts from reconstructed video.

As shown in FIG. 2, video encoder 20 receives a current video block within a video slice to be encoded. The slice may be divided into multiple video blocks. Mode select unit 40 may select one of the coding modes, intra- or inter-, for the current video block based on error results. If the intra- or inter-modes are selected, mode select unit 40 provides the resulting intra- or inter-coded block to summer 50 to generate residual block data and to summer 62 to reconstruct the encoded block for use as a reference picture. Intra-prediction processing unit 46 performs intra-predictive coding of the current video block relative to one or more neighboring blocks in the same frame or slice as the current block to be coded to provide spatial compression. Motion estimation unit 42 and motion compensation unit 44 perform inter-predictive coding of the current video block relative to one or more predictive blocks in one or more reference pictures to provide temporal compression.

In the case of inter-coding, motion estimation unit 42 may be configured to determine the inter-prediction mode for a video slice according to a predetermined pattern for a video sequence. The predetermined pattern may designate video slices in the sequence as P slices, B slices or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 66. For example, video encoder 20 may calculate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 66. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation. Upon receiving the motion vector for the PU of the current video block, motion compensation unit 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

After motion compensation unit 44 generates the predictive block for the current video block, video encoder 20 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter (QP). In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform CAVLC, CABAC, or another entropy encoding technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within one of the reference picture lists. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in reference picture memory 66. The reference block may be used by motion estimation unit 42 and motion compensation unit 44 as a reference block to inter-predict a block in a subsequent video frame or picture.

As one example, video encoder 20 may be configured to encode one or more pictures of video data during a video encoding process. For example, video encoder 20 may be configured to generate a bitstream that includes one or more pictures of a CVS, wherein a first picture of the one or more pictures according to a decoding order associated with the CVS is a RAP picture that is not an IDR picture. In this example, to generate the bitstream, video encoder 20 may be configured to avoid including at least one of the one or more pictures, other than the first picture, that corresponds to a leading picture associated with the first picture in the bitstream. For example, the leading picture may be a picture that follows the first picture according to the decoding order and precedes the first picture according to a display order associated with the CVS. Also in this example, as a result of video encoder 20 generating the bitstream in the manner described above, the first picture may be successfully decoded (e.g., by video decoder 30), i.e., be decodable. Additionally, at least one of the one or more pictures, other than the first picture, following the first picture according to the decoding order, also may be successfully decoded (e.g., by video decoder 30), or be decodable, based on the first picture (e.g., using the first picture as a reference picture, after the first picture has been decoded as described above).

Accordingly, as explained above, the techniques of this disclosure may enable video encoder 20 to generate a bitstream that may be decoded by a video decoder, e.g., video decoder 30, in a predictable and defined manner, as specified by the techniques of this disclosure. In particular, the bitstream may include one or more pictures of a CVS of video data. The bitstream may be received by the video decoder such that the bitstream begins with a non-IDR RAP picture. Using the techniques of this disclosure, the video decoder may successfully decode the bitstream. As such, there may be a relative improvement in user experience when performing random access of the bitstream, when using the disclosed techniques. As one example, the techniques may enable the video decoder to decode the bitstream with relatively greater granularity. In other words, the techniques may enable the video decoder to randomly access the bitstream at relatively more points, or pictures (i.e., non-IDR pictures) of the bitstream, compared to other techniques (e.g., techniques that allow random access of a bitstream only from IDR pictures). As another example, there may be a relative improvement in visual quality of one or more pictures of the CVS included in the bitstream, and/or of the CVS as a whole (e.g., by video encoder 20 omitting the leading pictures associated with the first picture from the bitstream), when using the disclosed techniques.

In this manner, video encoder 20 represents an example of a video encoder configured to generate a bitstream that includes one or more pictures of a CVS, wherein a first picture of the one or more pictures according to a decoding order associated with the CVS is a RAP picture that is not an IDR picture, wherein to generate the bitstream, the video encoder is configured to avoid including at least one of the one or more pictures, other than the first picture, that corresponds to a leading picture associated with the first picture in the bitstream, wherein the leading picture is a picture that follows the first picture according to the decoding order and precedes the first picture according to a display order associated with the CVS, and wherein the first picture is decodable, and wherein at least one of the one or more pictures, other than the first picture, following the first picture according to the decoding order, is decodable based on the first picture.

Figure 3:
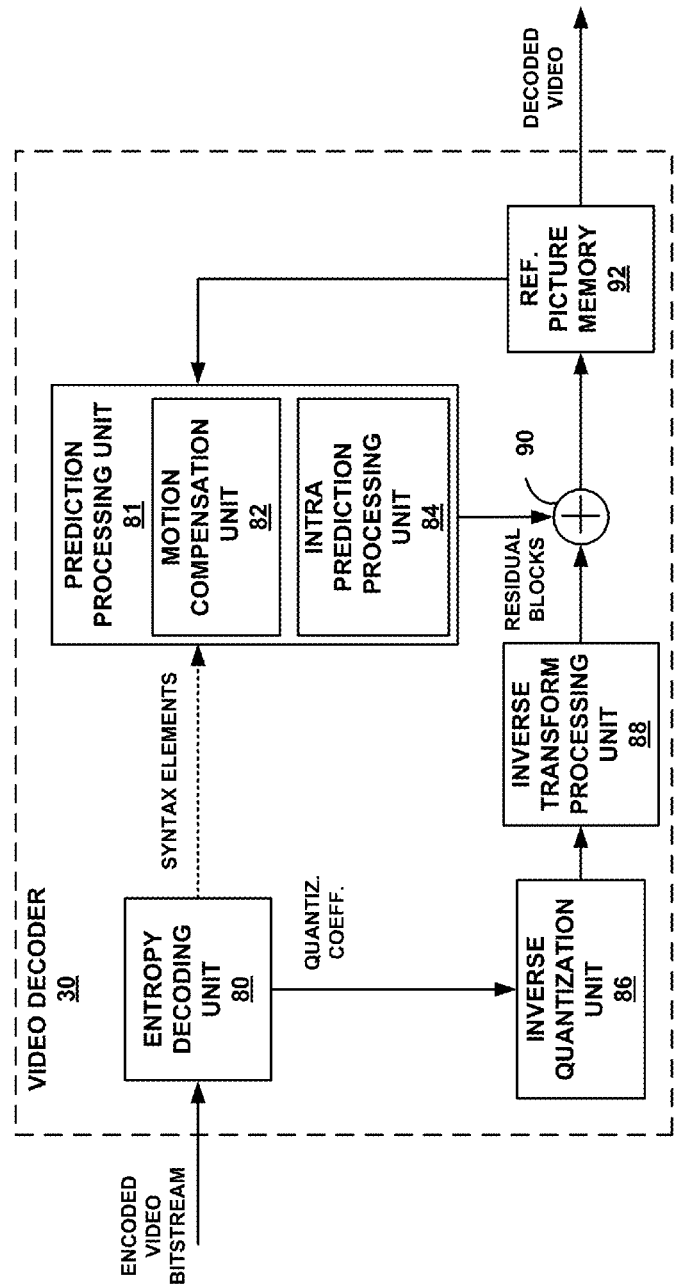
FIG. 3 is a block diagram that illustrates an example of a video decoder that may perform the techniques for random access with advanced DPB management, consistent with the techniques of this disclosure.

FIG. 3 is a block diagram that illustrates an example of a video decoder that may perform the techniques for random access with advanced DPB management, consistent with the techniques of this disclosure. In the example of FIG. 3, video decoder 30 includes an entropy decoding unit 80, a prediction processing unit 82, an inverse quantization unit 88, an inverse transform processing unit 90, a summer 92, a deblocking filter 94, and a reference picture memory 96. Prediction processing unit 82 includes motion compensation unit 84 and intra-prediction processing unit 86. Video decoder 30 may, in some examples, perform a decoding pass generally reciprocal to the encoding pass described with respect to video encoder 20 from FIG. 2.

During the decoding process, video decoder 30 receives an encoded video bitstream that represents video blocks of an encoded video slice and associated syntax elements from video encoder 20. When the represented video blocks in the bitstream include compressed video data, entropy decoding unit 80 of video decoder 30 entropy decodes the bitstream to generate quantized coefficients, motion vectors, and other syntax elements. Entropy decoding unit 80 forwards the motion vectors and other syntax elements to prediction processing unit 82. Video decoder 30 may receive the syntax elements at the video slice level and/or the video block level.

When the video slice is coded as an intra-coded (I) slice, intra-prediction processing unit 86 of prediction processing unit 82 may generate prediction data for a video block of the current video slice based on a signaled intra-prediction mode and data from previously decoded blocks of the current frame or picture. When the video frame is coded as an inter-coded (i.e., B, P or GPB) slice, motion compensation unit 84 of prediction processing unit 82 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference frame lists, List 0 and List 1, using default construction techniques based on reference pictures stored in reference picture memory 96.

Motion compensation unit 84 determines prediction information for a video block of the current video slice by parsing the motion vectors and other syntax elements, and uses the prediction information to produce the predictive blocks for the current video block being decoded. For example, motion compensation unit 84 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 84 may also perform interpolation based on interpolation filters. Motion compensation unit 84 may use interpolation filters as used by video encoder 20 during encoding of the video blocks to calculate interpolated values for sub-integer pixels of reference blocks. Motion compensation unit 84 may determine the interpolation filters used by video encoder 20 from the received syntax elements and use the interpolation filters to produce predictive blocks.

Inverse quantization unit 88 inverse quantizes, i.e., de-quantizes, the quantized transform coefficients provided in the bitstream and decoded by entropy decoding unit 80. The inverse quantization process may include use of a quantization parameter (QP) calculated by video encoder 20 for each video block in the video slice to determine a degree of quantization and, likewise, a degree of inverse quantization that should be applied. Inverse transform processing unit 90 applies an inverse transform, e.g., an inverse DCT, an inverse integer transform, or a conceptually similar inverse transform process, to the transform coefficients in order to produce residual blocks in the pixel domain.

After motion compensation unit 84 generates the predictive block for the current video block based on the motion vectors and other syntax elements, video decoder 30 forms a decoded video block by summing the residual blocks from inverse transform processing unit 90 with the corresponding predictive blocks generated by motion compensation unit 84. Summer 92 represents the component or components that perform this summation operation. A deblocking filter 94 is applied to filter the decoded blocks in order to remove blockiness artifacts. The decoded video blocks in a given frame or picture are then stored in reference picture memory 96, which stores reference pictures used for subsequent motion compensation. Reference picture memory 96 also stores decoded video for later presentation on a display device, such as display device 28 of FIG. 1.

As one example, video decoder 30 may be configured to decode one or more pictures of video data during a video decoding process. For example, video decoder 30 may be configured to receive a bitstream, e.g., generated by video encoder 20, that includes one or more pictures of a CVS. Video decoder 30 may be further configured to decode a first picture of the one or more pictures according to a decoding order associated with the CVS. In this example, the first picture may be a RAP picture that is not an IDR picture. Video decoder 30 may also be configured to decode at least one of the one or more pictures, other than the first picture, following the first picture according to the decoding order, based on the decoded first picture.

In some examples, video decoder 30 may be further configured to determine (or identify) at least one of the one or more pictures, other than the first picture, that corresponds to a leading picture associated with the first picture. In other words, video decoder 30 may be configured to identify at least one leading picture that is associated with the first picture among the one or more pictures. In these examples, the leading picture may once again be a picture that follows the first picture according to the decoding order and precedes the first picture according to a display order associated with the CVS. For example, video decoder 30 may be configured to decode the at least one of the one or more pictures. To decode each of the at least one of the one or more pictures, video decoder 30 may be configured to determine, or identify, one or more reference pictures used to encode the respective picture, determine whether any of the determined or identified one or more reference pictures is unavailable to be decoded, for each of the determined or identified one or more reference pictures that is determined to be unavailable to be decoded, generate a virtual reference picture, and decode the respective picture based on the corresponding one or more generated virtual reference pictures.

In the above-described examples, to generate the virtual reference picture, video decoder 30 may be configured to generate a picture that includes one or more pixel values that each correspond to a middle of a range of pixel values associated with the CVS. For example, video decoder 30 may be configured to generate the picture such that the picture includes one or more pixel values each having "luma" or "chroma" values of "127." In this example, each such pixel value may correspond to a middle of a range of luma or chroma pixel intensity values defined from a pixel intensity value of "0" to a pixel intensity value of "255." For example, each of the luma or chroma pixel intensity values may be represented using 7 bits of data, resulting in the above-described range of values. In other examples, however, the luma or chroma pixel intensity range, and the corresponding middle, or middle values, of the range, may be defined in a different manner.

In some examples, video decoder 30 may be further configured to determine, or identify, at least one of the one or more pictures, other than the first picture, that corresponds to a leading picture associated with the first picture. In these examples, once again, the leading picture may be a picture that follows the first picture according to the decoding order and precedes the first picture according to a display order associated with the CVS. Also in these examples, video decoder 30 may be configured to not output, or avoid outputting, one or more of the at least one of the one or more pictures (i.e., one or more of the previously determined, or identified, leading pictures associated with the first picture) for which an output flag (e.g., syntax element output_flag described above) indicates that the respective picture is to be output.

In other examples, video decoder 30 may be still further configured to determine, or identify, at least one of the one or more pictures, other than the first picture, that corresponds to a leading picture associated with the first picture. In these examples, once again, the leading picture may be a picture that follows the first picture according to the decoding order and precedes the first picture according to a display order associated with the CVS. Also in these examples, video decoder 30 may be configured not use, or avoid using, one or more of the at least one of the one or more pictures (i.e., one or more of the previously determined, or identified, leading pictures associated with the first picture) as a reference picture for decoding at least one of the one or more pictures, other than the first picture, that follows the first picture according to the decoding order and according to a display order associated with the CVS.

In some examples, the first picture may be a CRA picture. In these examples, the CRA picture may be a picture that is coded using intra-prediction coding and is able to be decoded, i.e., is decodable, without reference to any other pictures. In these examples, for the CRA picture, one or more pictures included within a CVS along with the CRA picture that follow the CRA picture according to a decoding order associated with the CVS may be decoded with reference to one or more pictures that precede the CRA picture according to the decoding order. For example, the CRA picture may be referred to an "Open-GOP" intra-coded picture, as described above with reference to FIG. 1. As also described above, the CRA picture may serve a similar purpose as an IDR picture in a "Closed-GOP" setting, particularly with regard to enabling random access of a bitstream that includes one or more pictures of one or more GOPs of video data.

In other examples, the IDR picture may be a picture that is coded using intra-prediction coding and is able to be decoded, i.e., is decodable, without reference to any other pictures. In these examples, for the IDR picture, all other pictures included within a CVS along with the IDR picture that follow the IDR picture according to a decoding order associated with the CVS may be decoded without reference to any pictures that precede the IDR picture according to the decoding order.

In still other examples, e.g., in instances where the bitstream received by video decoder 30 does not include any leading pictures associated with the first picture (for example, in cases where video encoder 20 generated the bitstream by excluding the leading pictures of the first picture from the bitstream), video decoder 30 may be configured to decode the bitstream in a particular manner, as illustrated by the examples below.

As one example, video decoder 30 may be further configured to decode a first set of coded picture buffer (CPB) initial delay parameters, and, when the one or more pictures do not include at least one leading picture associated with the first picture, decode one of a second set of CPB initial delay parameters, wherein the second set is different than the first set, and a set of CPB delay offset parameters. In this example, once again, the leading picture may be a picture that follows the first picture according to the decoding order and precedes the first picture according to a display order associated with the CVS.

In the above-described example, one or more of the first and second sets of CPB initial delay parameters and the set of CPB delay offset parameters may be included in one of a supplemental enhancement information (SEI) message, a picture buffering period SEI message, and a slice header, associated with the first picture.

Also in the above-described example, a CPB removal time of each picture following the first picture in the decoding order may be shifted earlier as indicated by one or more of the first and second sets of CPB initial delay parameters and the set of CPB delay offset parameters.

Accordingly, as explained above, the techniques of this disclosure may enable video decoder 30 to decode a bitstream, e.g., encoded by video encoder 20, in a predictable and defined manner, as specified by the techniques of this disclosure. In particular, the bitstream may include one or more pictures of a CVS of video data. The bitstream may be received by video decoder 30 such that the bitstream begins with a non-IDR RAP picture. Using the techniques of this disclosure, video decoder 30 may successfully decode the bitstream. As such, there may be a relative improvement in user experience when performing random access of the bitstream, when using the disclosed techniques. As one example, the techniques may enable video decoder 30 to decode the bitstream with relatively greater granularity. Stated another way, the techniques may enable video decoder 30 to randomly access the bitstream at relatively more points, or pictures (i.e., non-IDR pictures) of the bitstream, compared to other techniques (e.g., techniques that allow random access of a bitstream only from IDR pictures). As another example, there may be a relative improvement in visual quality of one or more pictures of the CVS included in the bitstream, and/or of the CVS as a whole (e.g., by video decoder 30 avoiding outputting and using as reference pictures the leading pictures associated with the first picture), when using the disclosed techniques.

In this manner, video decoder 30 represents an example of a video decoder configured to receive a bitstream comprising one or more pictures of a CVS, decode a first picture of the one or more pictures according to a decoding order associated with the CVS, wherein the first picture is a RAP picture that is not an IDR picture, and decode at least one of the one or more pictures, other than the first picture, following the first picture according to the decoding order, based on the decoded first picture.

Figure 5:
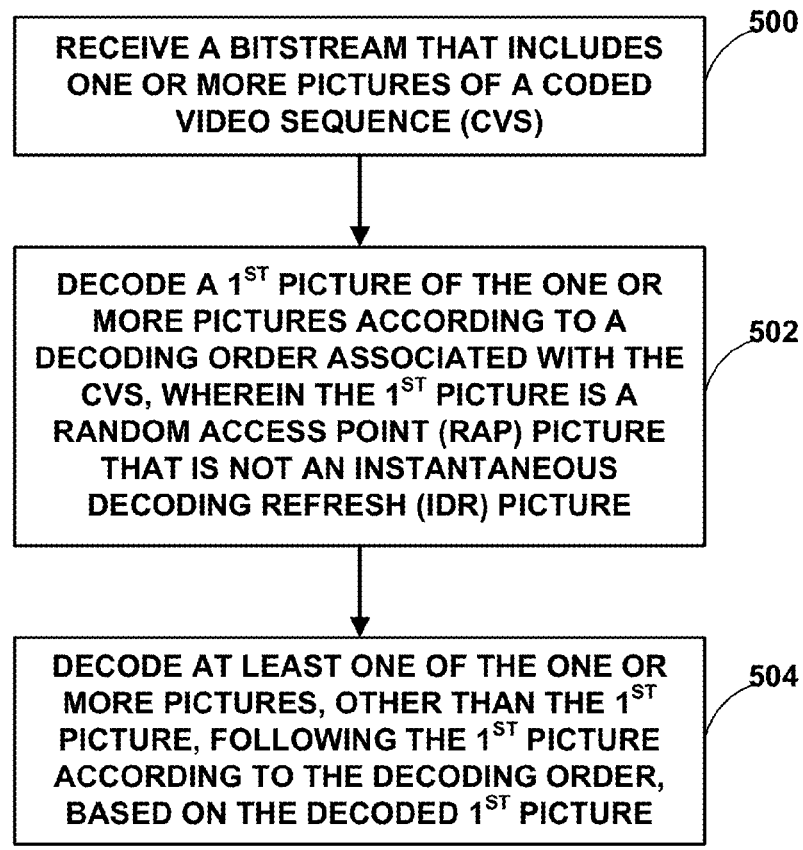
FIG. 5 is a flowchart that illustrates an example method of performing random access of a bitstream that includes one or more pictures of video data by a video decoder, consistent with the techniques of this disclosure.
Figure 6:
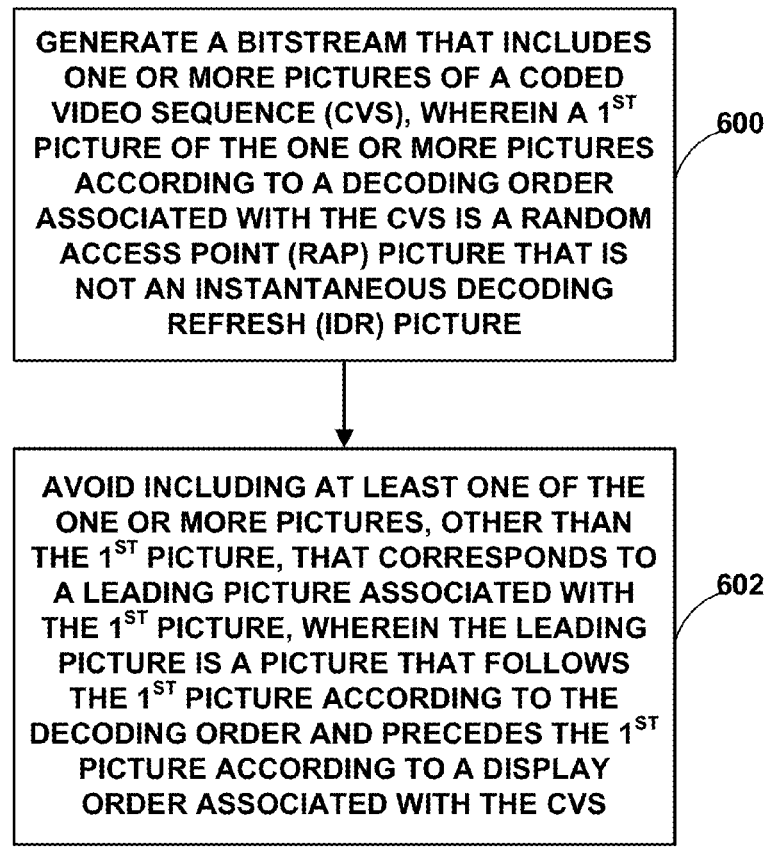
FIG. 6 is a flowchart that illustrates an example method of generating a bitstream that includes one or more pictures of video data by a video encoder, consistent with the techniques of this disclosure.

FIGS. 5 and 6 are flowcharts that illustrate example methods of performing the techniques for random access with advanced DPB management, consistent with the techniques of this disclosure. In particular, the example method of FIG. 5 illustrates performing the techniques from the standpoint of a video decoder, e.g., video decoder 30 of FIGS. 1 and 3. Additionally, the example method of FIG. 6 illustrates performing the techniques from the standpoint of a video encoder, e.g., video encoder 20 of FIGS. 1 and 2.

The techniques of FIGS. 5 and 6 may generally be performed by any processing unit or processor, whether implemented in hardware, software, firmware, or a combination thereof, and when implemented in software or firmware, corresponding hardware may be provided to execute instructions for the software or firmware. For purposes of example, the techniques of FIGS. 5 and 6 are described with respect to various components of video encoder 20 (FIG. 2) and/or video decoder 30 (FIG. 3), although it should be understood that other devices may be configured to perform similar techniques. Moreover, the steps illustrated in FIGS. 5 and 6 may be performed in a different order or in parallel, and additional steps may be added and certain steps omitted, without departing from the techniques of this disclosure. Additionally, consistent with the techniques of this disclosure, the techniques of the example methods of FIGS. 5 and 6 may be performed individually or in combination with one another.

FIG. 5 is a flowchart that illustrates an example method of performing random access of a bitstream that includes one or more pictures of video data by a video decoder, e.g., video decoder 30 of FIGS. 1 and 3, consistent with the techniques of this disclosure. In particular, the techniques of the example method of FIG. 5 include performing the random access of the bitstream in instances where a first picture of the bitstream is a non-IDR RAP picture in a specific manner, as described below.

As one example, video decoder 30 may receive a bitstream that includes one or more pictures of a CVS (500). Video decoder 30 may further decode a first picture of the one or more pictures according to a decoding order associated with the CVS, wherein the first picture is a RAP picture that is not an IDR picture (502). Video decoder 30 may also decode at least one of the one or more pictures, other than the first picture, following the first picture according to the decoding order, based on the decoded first picture (504).

In some examples, video decoder 30 may further determine, or identify, at least one of the one or more pictures, other than the first picture, that corresponds to a leading picture associated with the first picture. In these examples, once again, the leading picture may be a picture that follows the first picture according to the decoding order and precedes the first picture according to a display order associated with the CVS. Video decoder 30 may further decode the at least one of the one or more pictures. In these examples, to decode each of the at least one of the one or more pictures, video decoder 30 may perform the following steps: (1) determine, or identify, one or more reference pictures used to encode the respective picture; (2) determine whether any of the determined or identified one or more reference pictures is unavailable to be decoded; (3) for each of the determined or identified one or more reference pictures that is determined to be unavailable to be decoded, generate a virtual reference picture; and (4) decode the respective picture based on the corresponding one or more generated virtual reference pictures.

In the above-described examples, to generate the virtual reference picture, video decoder 30 may generate a picture that includes one or more pixel values that each correspond to a middle of a range of pixel values associated with the CVS (e.g., one or more luma or chroma pixel values of "127" within a range of "0" to "255"), as described above with reference to FIG. 3.

In some examples, video decoder 30 may further determine, or identify, at least one of the one or more pictures, other than the first picture, that corresponds to a leading picture associated with the first picture. In these examples, once again, the leading picture may be a picture that follows the first picture according to the decoding order and precedes the first picture according to a display order associated with the CVS. Also in these examples, video decoder 30 may further avoid outputting one or more of the at least one of the one or more pictures (i.e., one or more of the previously determined, or identified, leading pictures associated with the first picture) for which an output flag (e.g., syntax element output_flag) indicates that the respective picture is to be output.

In other examples, video decoder 30 may further determine, or identify, at least one of the one or more pictures, other than the first picture, that corresponds to a leading picture associated with the first picture. In these examples, once again, the leading picture may be a picture that follows the first picture according to the decoding order and precedes the first picture according to a display order associated with the CVS. Also in these examples, video decoder 30 may further avoid using one or more of the at least one of the one or more pictures (i.e., one or more of the previously determined, or identified, leading pictures associated with the first picture) as a reference picture for decoding at least one of the one or more pictures, other than the first picture, that follows the first picture according to the decoding order and according to a display order associated with the CVS.

In the above-described examples, the first picture may be a CRA picture. In these examples, the CRA picture may be a picture that is coded using intra-prediction coding and is able to be decoded, i.e., is decodable, without reference to any other pictures. In these examples, for the CRA picture, one or more pictures included within a CVS along with the CRA picture that follow the CRA picture according to a decoding order associated with the CVS may be decoded with reference to one or more pictures that precede the CRA picture according to the decoding order. For example, as described above, the CRA picture may be referred to an "Open-GOP" intra-coded picture, as described above with reference to FIG. 1. As also described above, the CRA picture may serve a similar purpose as an IDR picture in a "Closed-GOP" setting, particularly with regard to enabling random access of a bitstream that includes one or more pictures of one or more GOPs of video data.

Also in the above-described examples, the IDR picture may be a picture that is coded using intra-prediction coding and is able to be decoded, i.e., is decodable, without reference to any other pictures. Furthermore, the IDR picture may be a picture for which all other pictures included within a CVS along with the IDR picture that follow the IDR picture according to a decoding order associated with the CVS are decoded without reference to any pictures that precede the IDR picture according to the decoding order.

In still other examples, e.g., in instances where the bitstream received by video decoder 30 does not include any leading pictures associated with the first picture (for example, in cases where video encoder 20 generated the bitstream by excluding the leading pictures of the first picture from the bitstream), video decoder 30 may decode the bitstream in a particular manner, as illustrated by the examples below.

As one example, video decoder 30 may be further decode a first set of CPB initial delay parameters, and, when the one or more pictures do not include at least one leading picture associated with the first picture, decode one of a second set of CPB initial delay parameters, wherein the second set is different than the first set, and a set of CPB delay offset parameters. In this example, once again, the leading picture may be a picture that follows the first picture according to the decoding order and precedes the first picture according to a display order associated with the CVS.

In the above-described example, one or more of the first and second sets of CPB initial delay parameters and the set of CPB delay offset parameters may be included in one of a SEI message, a picture buffering period SEI message, and a slice header, associated with the first picture.

Also in the above-described example, a CPB removal time of each picture following the first picture in the decoding order may be shifted earlier as indicated by one or more of the first and second sets of CPB initial delay parameters and the set of CPB delay offset parameters.

In this manner, the method of FIG. 5 represents an example of a method of receiving a bitstream comprising one or more pictures of a CVS, decoding a first picture of the one or more pictures according to a decoding order associated with the CVS, wherein the first picture is a RAP picture that is not an IDR picture, and decoding at least one of the one or more pictures, other than the first picture, following the first picture according to the decoding order, based on the decoded first picture.

FIG. 6 is a flowchart that illustrates an example method of generating a bitstream that includes one or more pictures of video data by a video encoder, e.g., video encoder 20 of FIGS.

1 and 2, consistent with the techniques of this disclosure. In particular, the techniques of the example method of FIG. 6 include generating the bitstream, such that a video decoder, e.g., video decoder 30, may successfully decode the bitstream in a specific manner. For example, the video decoder may decode the bitstream in instances where a first picture of the bitstream is a non-IDR RAP picture, as described below.

As one example, video encoder 20 may generate a bitstream that includes one or more pictures of a CVS. In this example, a first picture of the one or more pictures according to a decoding order associated with the CVS may be a RAP picture that is not an IDR picture (600). Video encoder 20 may further avoid including at least one of the one or more pictures, other than the first picture, that corresponds to a leading picture associated with the first picture in the bitstream. In this example, once again, the leading picture may be a picture that follows the first picture according to the decoding order and precedes the first picture according to a display order associated with the CVS (602).

In this example, subsequently, a video decoder, e.g., video decoder 30, may receive the bitstream generated by video encoder 20, and decode the bitstream. For example, the video decoder may decode the first picture. The video decoder may further decode at least one of the one or more pictures, other than the first picture, following the first picture according to the decoding order, based on the first picture (e.g., based on a decoded version of the first picture).

In this manner, the method of FIG. 6 represents an example of a method of generating a bitstream comprising one or more pictures of a CVS, wherein a first picture of the one or more pictures according to a decoding order associated with the CVS is a RAP picture that is not an IDR picture, wherein generating the bitstream comprises avoiding including at least one of the one or more pictures, other than the first picture, that corresponds to a leading picture associated with the first picture in the bitstream, wherein the leading picture comprises a picture that follows the first picture according to the decoding order and precedes the first picture according to a display order associated with the CVS, and wherein the first picture is decodable, and wherein at least one of the one or more pictures, other than the first picture, following the first picture according to the decoding order, is decodable based on the first picture.

In one or more examples, the functions described herein may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which may correspond to tangible or non-transitory media, such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium, such as a signal or carrier wave. Data storage media may be any available media that can be accessed by one or more computers or one or more processors to retrieve instructions, code, and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient or non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more general purpose microprocessors, DSPs, ASICs, FPGAs, or other equivalent integrated or discrete logic circuitry. Accordingly, the term "processor," as used herein, may refer to any of the foregoing structure or any other structure suitable for implementation of the techniques described in this disclosure. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an IC or a set of ICs (e.g., a chip set). Various components, modules, or units are described in this disclosure to emphasize functional aspects of devices configured to perform the disclosed techniques, but do not necessarily require realization by different hardware components, modules, or units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   receiving a bitstream comprising one or more coded video sequences (CVSs), each CVS comprising one or more pictures,
   wherein a first picture in decoding order in a first CVS of the one or more CVSs is a random access point (RAP) picture that is not an instantaneous decoding refresh (IDR) picture; and
   decoding the bitstream at least in part by parsing two sets of coded picture buffer (CPB) initial delay parameters and by selecting one of the two sets of CPB initial delay parameters for a derivation of CPB timing parameters.

2. The method of claim 1, further comprising:
   identifying at least one of the one or more pictures, other than the first picture of the first CVS, that corresponds to a leading picture associated with the first picture of the first CVS, wherein the leading picture comprises a picture that follows the first picture according to the decoding order and precedes the first picture according to a display order associated with the first CVS; and decoding the at least one of the one or more pictures, wherein decoding each of the at least one of the one or more pictures includes:

identifying one or more reference pictures used to encode the at least one of the one or more pictures;

determining whether any of the identified one or more reference pictures is unavailable to be decoded;

for each of the identified one or more reference pictures that is determined to be unavailable to be decoded, generating a virtual reference picture; and decoding the at least one of the one or more pictures based on the corresponding one or more generated virtual reference pictures.

3. The method of claim 2, wherein generating the virtual reference picture comprises generating a picture that includes one or more pixel values that each correspond to a middle of a range of pixel values associated with the first CVS.

4. The method of claim 1, further comprising:

identifying at least one of the one or more pictures, other than the first picture of the first CVS, that corresponds to a leading picture associated with the first picture of the first CVS, wherein the leading picture comprises a picture that follows the first picture of the first CVS according to the decoding order and precedes the first picture of the first CVS according to a display order associated with the first CVS; and avoiding outputting any of the at least one of the one or more pictures for which an output flag indicates that the respective picture is to be output.

5. The method of claim 1, further comprising:

identifying at least one of the one or more pictures, other than the first picture of the first CVS, that corresponds to a leading picture associated with the first picture, wherein the leading picture comprises a picture that follows the first picture of the first CVS according to the decoding order and precedes the first picture of the first CVS according to a display order associated with the first CVS; and avoiding using one or more of the at least one of the one or more pictures as a reference picture for decoding at least one of the one or more pictures, other than the first picture of the first CVS, that follows the first picture of the first CVS according to the decoding order and according to a display order associated with the first CVS.

6. The method of claim 1, wherein the first picture of the first CVS comprises a clean random access (CRA) picture, wherein the CRA picture comprises a picture that is encoded using intra-prediction coding and is decodable without reference to any other pictures, and for which one or more pictures included within the first CVS along with the CRA picture that follow the CRA picture according to a decoding order associated with the first CVS may be decoded with reference to one or more pictures that precede the CRA picture according to the decoding order.

7. The method of claim 1, wherein the IDR picture comprises a picture that is encoded using intra-prediction coding and is decodable without reference to any other pictures, and for which all other pictures included within a respective CVS of the one or more CVSs along with the IDR picture that follow the IDR picture according to a decoding order associated with the respective CVS are decoded without reference to any pictures that precede the IDR picture according to the decoding order.

8. The method of claim 1, wherein the two sets of CPB initial delay parameters includes a first set of CPB initial delay parameters and a second set of CPB initial delay parameters, and wherein selecting the one of the two sets of the CPB initial delay parameters comprises:

decoding the first set of CPB initial delay parameters, and, when the one or more pictures do not include at least one leading picture associated with the first picture, decoding the second set of CPB initial delay parameters, wherein the second set is different than the first set, and a set of CPB delay offset parameters, wherein the leading picture comprises a picture that follows the first picture of the first CVS according to the decoding order and precedes the first picture according to a display order associated with the first CVS.

9. The method of claim 8, wherein one or more of the first and second sets of CPB initial delay parameters and the set of CPB delay offset parameters are included in one of a supplemental enhancement information (SEI) message, a picture buffering period SEI message, and a slice header, associated with the first picture of the first CVS.

10. The method of claim 8, wherein a CPB removal time of each picture following the first picture of the first CVS in the decoding order is shifted earlier as indicated by one or more of the first and second sets of CPB initial delay parameters and the set of CPB delay offset parameters.

11. A method of encoding video data, the method comprising:

generating a bitstream comprising one or more coded video sequences (CVSs), each CVS comprising one or more pictures, wherein a first picture in a decoding order of the one or more pictures associated with a first CVS of the one or more CVSs is a random access point (RAP) picture that is not an instantaneous decoding refresh (IDR) picture, and wherein the bitstream comprises two sets of coded picture buffer (CPB) initial delay parameters from which CPB timing parameters are derivable.

12. An apparatus configured to decode video data, the apparatus comprising a video decoder configured to:

receive a bitstream comprising one or more coded video sequences (CVSs), each CVS comprising one or more pictures, wherein a first picture in decoding order in a first CVS of the one or more CVSs is a random access point (RAP) picture that is not an instantaneous decoding refresh (IDR) picture; and decode the bitstream at least in part by parsing two sets of coded picture buffer (CPB) initial delay parameters and by selecting one of the two sets of CPB initial delay parameters for a derivation of CPB timing parameters.

13. The apparatus of claim 12, wherein the video decoder is further configured to:

identify at least one of the one or more pictures, other than the first picture of the first CVS, that corresponds to a leading picture associated with the first picture, wherein the leading picture comprises a picture that follows the first picture of the first CVS according to the decoding order and precedes the first picture according to a display order associated with the first CVS; and decode the at least one of the one or more pictures, wherein to decode each of the at least one of the one or more pictures, the video decoder is configured to:

identify one or more reference pictures used to encode the at least one of the one or more pictures;

determine whether any of the identified one or more reference pictures is unavailable to be decoded;

for each of the identified one or more reference pictures that is determined to be unavailable to be decoded, generate a virtual reference picture; and decode the at least one of the one or more pictures based on the corresponding one or more generated virtual reference pictures.

14. The apparatus of claim 13, wherein to generate the virtual reference picture, the video decoder is configured to generate a picture that includes one or more pixel values that each correspond to a middle of a range of pixel values associated with the first CVS.

15. The apparatus of claim 12, wherein the video decoder is further configured to:

identify at least one of the one or more pictures, other than the first picture of the first CVS, that corresponds to a leading picture associated with the first picture, wherein the leading picture comprises a picture that follows the first picture of the first CVS according to the decoding order and precedes the first picture of the first CVS according to a display order associated with the CVS; and avoid outputting any of the at least one of the one or more pictures for which an output flag indicates that the respective picture is to be output.

16. The apparatus of claim 12, wherein the video decoder is further configured to:

identify at least one of the one or more pictures, other than the first picture of the first CVS, that corresponds to a leading picture associated with the first picture of the first CVS, wherein the leading picture comprises a picture that follows the first picture of the first CVS according to the decoding order and precedes the first picture of the first CVS according to a display order associated with the first CVS; and avoid using any of the at least one of the one or more pictures as a reference picture for decoding at least one of the one or more pictures, other than the first picture, that follows the first picture according to the decoding order and according to a display order associated with the CVS.

17. The apparatus of claim 12, wherein the first picture of the first CVS comprises a clean random access (CRA) picture, wherein the CRA picture comprises a picture that is encoded using intra-prediction coding and is decodable without reference to any other pictures, and for which one or more pictures included within the first CVS along with the CRA picture that follow the CRA picture according to a decoding order associated with the first CVS may be decoded with reference to one or more pictures that precede the CRA picture according to the decoding order.

18. The apparatus of claim 12, wherein the IDR picture comprises a picture that is encoded using intra-prediction coding and is decodable without reference to any other pictures, and for which all other pictures included within a respective CVS of the one or more CVSs along with the IDR picture that follow the IDR picture according to a decoding order associated with the respective CVS are decoded without reference to any pictures that precede the IDR picture according to the decoding order.

19. The apparatus of claim 12, wherein the two sets of CPB initial delay parameters includes a first set of CPB initial delay parameters and a second set of CPB initial delay parameters, and wherein, to select the one of the two sets of the CPB initial delay parameters, the video decoder is configured to:

decode the first set of CPB initial delay parameters, and, when the one or more pictures do not include at least one leading picture associated with the first picture, decode the second set of CPB initial delay parameters, wherein the second set is different than the first set, and a set of CPB delay offset parameters, wherein the leading picture comprises a picture that follows the first picture of the first CVS according to the decoding order and precedes the first picture according to a display order associated with the first CVS.

20. The apparatus of claim 19, wherein one or more of the first and second sets of CPB initial delay parameters and the set of CPB delay offset parameters are included in one of a supplemental enhancement information (SEI) message, a picture buffering period SEI message, and a slice header, associated with the first picture of the first CVS.

21. The apparatus of claim 19, wherein a CPB removal time of each picture following the first picture of the first CVS in the decoding order is shifted earlier as indicated by one or more of the first and second sets of CPB initial delay parameters and the set of CPB delay offset parameters.

22. The apparatus of claim 12, wherein the apparatus comprises at least one of:

an integrated circuit;
a microprocessor; or
a wireless communication device that includes the video decoder.

23. An apparatus configured to encode video data, the apparatus comprising a video encoder configured to:

generate a bitstream comprising one or more coded video sequences (CVSs), each CVS comprising one or more pictures, wherein a first picture in a decoding order of the one or more pictures associated with a first CVS of the one or more CVSs is a random access point (RAP) picture that is not an instantaneous decoding refresh (IDR) picture, and wherein the bitstream comprises two sets of coded picture buffer (CPB) initial delay parameters from which CPB timing parameters are derivable.

24. The apparatus of claim 23, wherein the apparatus comprises at least one of:

an integrated circuit;
a microprocessor; or
a wireless communication device that includes the video encoder.

25. A device for decoding video data, the device comprising:

means for receiving a bitstream comprising one or more coded video sequences (CVSs), each CVS comprising one or more pictures, wherein a first picture in decoding order in a first CVS of the one or more CVSs is a random access point (RAP) picture that is not an instantaneous decoding refresh (IDR) picture; and means for decoding the bitstream at least in part by parsing two sets of coded picture buffer (CPB) initial delay parameters and by selecting one of the two sets of CPB initial delay parameters for a derivation of CPB timing parameters.

26. The device of claim 25, further comprising:

means for identifying at least one of the one or more pictures, other than the first picture of the first CVS, that corresponds to a leading picture associated with the first picture of the first CVS, wherein the leading picture comprises a picture that follows the first picture according to the decoding order and precedes the first picture according to a display order associated with the CVS; and means for decoding the at least one of the one or more pictures, wherein the means for decoding each of the at least one of the one or more pictures includes:
  means for identifying one or more reference pictures used to encode the at least one of the one or more pictures;
  means for determining whether any of the identified one or more reference pictures is unavailable to be decoded;
  means for, for each of the identified one or more reference pictures that is determined to be unavailable to be decoded, generating a virtual reference picture; and
  means for decoding the at least one of the one or more pictures based on the corresponding one or more generated virtual reference pictures.

27. The device of claim 26, wherein the means for generating the virtual reference picture comprises means for generating a picture that includes one or more pixel values that each correspond to a middle of a range of pixel values associated with the first CVS.

28. The device of claim 25, further comprising:
  means for identifying at least one of the one or more pictures, other than the first picture, that corresponds to a leading picture associated with the first picture, wherein the leading picture comprises a picture that follows the first picture according to the decoding order and precedes the first picture according to a display order associated with the CVS; and
  means for avoiding outputting one or more of the at least one of the one or more pictures for which an output flag indicates that the respective picture is to be output.

29. The device of claim 25, further comprising:
  means for identifying at least one of the one or more pictures, other than the first picture of the first CVS, that corresponds to a leading picture associated with the first picture of the first CVS, wherein the leading picture comprises a picture that follows the first picture of the first CVS according to the decoding order and precedes the first picture of the first CVS according to a display order associated with the first CVS; and
  means for avoiding using any of the at least one of the one or more pictures as a reference picture for decoding at least one of the one or more pictures, other than the first picture, that follows the first picture according to the decoding order and according to a display order associated with the CVS.

30. The device of claim 25, wherein the first picture of the first CVS comprises a clean random access (CRA) picture, wherein the CRA picture comprises a picture that is encoded using intra-prediction coding and is decodable without reference to any other pictures, and for which one or more pictures included within the first CVS along with the CRA picture that follow the CRA picture according to a decoding order associated with the first CVS may be decoded with reference to one or more pictures that precede the CRA picture according to the decoding order.

31. The device of claim 25, wherein the IDR picture comprises a picture that is encoded using intra-prediction coding and is decodable without reference to any other pictures, and for which all other pictures included within a respective CVS of the one or more CVSs along with the IDR picture that follow the IDR picture according to a decoding order associated with the respective CVS are decoded without reference to any pictures that precede the IDR picture according to the decoding order.

32. The device of claim 25, wherein the two sets of CPB initial delay parameters includes a first set of CPB initial delay parameters and a second set of CPB initial delay parameters, and wherein the means for selecting the one of the two sets of the CPB initial delay parameters comprises:
  means for decoding the first set of CPB initial delay parameters, and, when the one or more pictures do not include at least one leading picture associated with the first picture, decoding the second set of CPB initial delay parameters, wherein the second set is different than the first set, and a set of CPB delay offset parameters,
  wherein the leading picture comprises a picture that follows the first picture of the first CVS according to the decoding order and precedes the first picture according to a display order associated with the first CVS.

33. The device of claim 32, wherein one or more of the first and second sets of CPB initial delay parameters and the set of CPB delay offset parameters are included in one of a supplemental enhancement information (SEI) message, a picture buffering period SEI message, and a slice header, associated with the first picture of the first CVS.

34. The device of claim 32, wherein a CPB removal time of each picture following the first picture of the first CVS in the decoding order is shifted earlier as indicated by one or more of the first and second sets of CPB initial delay parameters and the set of CPB delay offset parameters.

35. A computer-readable storage medium storing instructions that, when executed, cause one or more processors to decode video data, wherein the instructions cause the one or more processors to:
  receive a bitstream comprising one or more coded video sequences (CVSs), each CVS comprising one or more pictures,
  wherein a first picture in decoding order in a first CVS of the one or more CVSs is a random access point (RAP) picture that is not an instantaneous decoding refresh (IDR) picture; and
  decode the bitstream at least in part by parsing two sets of coded picture buffer (CPB) initial delay parameters and by selecting one of the two sets of CPB initial delay parameters for a derivation of CPB timing parameters.

36. The computer-readable storage medium of claim 35, further comprising instructions that cause the one or more processors to:
  identify at least one of the one or more pictures, other than the first picture of the first CVS, that corresponds to a leading picture associated with the first picture of the first CVS, wherein the leading picture comprises a picture that follows the first picture according to the decoding order and precedes the first picture according to a display order associated with the CVS; and
  decode the at least one of the one or more pictures, wherein the instructions that cause the one or more processors to decode each of the at least one of the one or more pictures include instructions that cause the one or more processors to:
    identify one or more reference pictures used to encode the at least one of the one or more pictures;
    determine whether any of the identified one or more reference pictures is unavailable to be decoded;
    for each of the identified one or more reference pictures that is determined to be unavailable to be decoded, generate a virtual reference picture; and
    decode the at least one of the one or more pictures based on the corresponding one or more generated virtual reference pictures.

37. The computer-readable storage medium of claim 36, wherein the instructions that cause the one or more processors to generate the virtual reference picture comprise instructions that cause the one or more processors to generate a picture that includes one or more pixel values that each correspond to a middle of a range of pixel values associated with the first CVS.

38. The computer-readable storage medium of claim 35, further comprising instructions that cause the one or more processors to:
   determine at least one of the one or more pictures, other than the first picture of the first CVS, that corresponds to a leading picture associated with the first picture of the first CVS, wherein the leading picture comprises a picture that follows the first picture of the first CVS according to the decoding order and precedes the first picture according to a display order associated with the first CVS; and
   avoid outputting any of the at least one of the one or more pictures for which an output flag indicates that the respective picture is to be output.

39. The computer-readable storage medium of claim 35, further comprising instructions that cause the one or more processors to:
   determine at least one of the one or more pictures, other than the first picture of the first CVS, that corresponds to a leading picture associated with the first picture, wherein the leading picture comprises a picture that follows the first picture of the first CVS according to the decoding order and precedes the first picture of the first CVS according to a display order associated with the first CVS; and
   avoid using one or more of the at least one of the one or more pictures as a reference picture for decoding at least one of the one or more pictures, other than the first picture of the first CVS, that follows the first picture of the first CVS according to the decoding order and according to a display order associated with the first CVS.

40. The computer-readable storage medium of claim 35, wherein the first picture of the first CVS comprises a clean random access (CRA) picture, wherein the CRA picture comprises a picture that is encoded using intra-prediction coding and is decodable without reference to any other pictures, and for which one or more pictures included within the first CVS along with the CRA picture that follow the CRA picture according to a decoding order associated with the first CVS may be decoded with reference to one or more pictures that precede the CRA picture according to the decoding order.

41. The computer-readable storage medium of claim 35, wherein the IDR picture comprises a picture that is encoded using intra-prediction coding and is decodable without reference to any other pictures, and for which all other pictures included within a respective CVS of the one or more CVSs along with the IDR picture that follow the IDR picture according to a decoding order associated with the respective CVS are decoded without reference to any pictures that precede the IDR picture according to the decoding order.

42. The computer-readable storage medium of claim 35, wherein the two sets of CPB initial delay parameters includes a first set of CPB initial delay parameters and a second set of CPB initial delay parameters, and wherein the instructions that cause the one or more processors to select the one of the two sets of the CPB initial delay parameters comprise instructions that cause the one or more processors to:
   decode the first set of CPB initial delay parameters, and, when the one or more pictures do not include at least one leading picture associated with the first picture, decode the second set of CPB initial delay parameters, wherein the second set is different than the first set, and a set of CPB delay offset parameters,
   wherein the leading picture comprises a picture that follows the first picture of the first CVS according to the decoding order and precedes the first picture according to a display order associated with the first CVS.

43. The computer-readable storage medium of claim 42, wherein one or more of the first and second sets of CPB initial delay parameters and the set of CPB delay offset parameters are included in one of a supplemental enhancement information (SEI) message, a picture buffering period SEI message, and a slice header, associated with the first picture of the first CVS.

44. The computer-readable storage medium of claim 42, wherein a CPB removal time of each picture following the first picture of the first CVS in the decoding order is shifted earlier as indicated by one or more of the first and second sets of CPB initial delay parameters and the set of CPB delay offset parameters.

* * * * *